(12) United States Patent
Hadler-Jacobsen et al.

(10) Patent No.: US 10,763,736 B2
(45) Date of Patent: Sep. 1, 2020

(54) LONG DISTANCE POWER TRANSMISSION WITH MAGNETIC GEARING

(71) Applicant: OneSubsea IP UK Limited, London (GB)

(72) Inventors: Aage Hadler-Jacobsen, Nesttun (NO); Audun Magne Askeland, Bergen (NO)

(73) Assignee: OneSubsea IP UK Limited, London (GB)

(*) Notice: Subject to any disclaimer, the term of this patent is extended or adjusted under 35 U.S.C. 154(b) by 259 days.

(21) Appl. No.: 15/192,275

(22) Filed: Jun. 24, 2016

(65) Prior Publication Data
US 2017/0373581 A1 Dec. 28, 2017

(51) Int. Cl.
| | |
|---|---|
| H02K 49/10 | (2006.01) |
| H02K 5/132 | (2006.01) |
| H02K 7/11 | (2006.01) |
| H02K 16/02 | (2006.01) |
| H02K 7/18 | (2006.01) |
| H02K 11/00 | (2016.01) |
| F04D 13/08 | (2006.01) |

(52) U.S. Cl.
CPC ............. *H02K 49/102* (2013.01); *H02K 7/11* (2013.01); *H02K 7/183* (2013.01); *H02K 7/1823* (2013.01); *H02K 11/0094* (2013.01); *H02K 16/02* (2013.01); *F04D 13/086* (2013.01); *H02K 5/132* (2013.01)

(58) Field of Classification Search
CPC ........ H02K 49/102; H02K 51/00; H02K 7/11; H02K 7/1823; H02K 7/183; H02K 11/0094; H02K 16/02; F04D 13/086

USPC .................................................. 310/87, 103
See application file for complete search history.

(56) References Cited

U.S. PATENT DOCUMENTS

| | | | |
|---|---|---|---|
| 3,683,249 A | 8/1972 | Shibata | |
| 4,237,703 A * | 12/1980 | Wahl, Jr. ................ | F16D 3/02 310/103 |

(Continued)

FOREIGN PATENT DOCUMENTS

| | | | | |
|---|---|---|---|---|
| WO | 2013039404 A1 | 3/2013 | | |
| WO | 2013062422 A1 * | 5/2013 | ............... | H02J 3/34 |

(Continued)

OTHER PUBLICATIONS

Extended European Search Report issued in European Patent Application No. 17177912.7 dated Nov. 10, 2017; 8 pages.

*Primary Examiner* — Burton S Mullins
(74) *Attorney, Agent, or Firm* — Helene Raybaud

(57) ABSTRACT

Low frequency power is transmitted over long distances from a surface power supply to a subsea rotating machine, such as a pump or compressor. The low frequency power is used to rotate a motor at low speed. A liquid filled magnetic step-up gear module might be used to increase the low speed motor shaft to a higher speed output shaft that can be used to operate the rotating machine. The magnetic gear module can be configured as a fixed ratio, and the surface power supply can be configured to adjust the power frequency to change the speed of a single subsea rotating machine. In other embodiments, the magnetic gear module can provide a variable gear ratio. A fixed low frequency might be transmitted from the surface and multiple subsea loads can be operated from the same power source, each having their own variable magnetic gear module.

28 Claims, 15 Drawing Sheets

(56) References Cited

U.S. PATENT DOCUMENTS

| | | | | |
|---|---|---|---|---|
| 4,732,225 A * | 3/1988 | Jurgens | ............. | E21B 4/00 166/66.5 |
| 6,863,124 B2 * | 3/2005 | Araux | ............. | E21B 43/128 166/105 |
| 7,481,283 B2 * | 1/2009 | McDonald | ............. | E21B 4/006 166/316 |
| 7,549,467 B2 * | 6/2009 | McDonald | ............. | E21B 4/006 166/105 |
| 8,456,116 B2 * | 6/2013 | Burdick | ............. | H02P 27/06 318/400.29 |
| 2011/0037333 A1 * | 2/2011 | Atallah | ............. | H02K 49/102 310/98 |
| 2011/0127869 A1 * | 6/2011 | Atallah | ............. | H02K 49/06 310/94 |
| 2011/0251728 A1 * | 10/2011 | Batho | ............. | F04B 47/06 700/282 |
| 2011/0304289 A1 * | 12/2011 | Burdick | ............. | H02J 13/0096 318/400.3 |
| 2013/0002075 A1 * | 1/2013 | Edwards | ............. | H02K 49/06 310/103 |
| 2014/0069629 A1 * | 3/2014 | McCann | ............. | E21B 43/128 166/66.4 |
| 2014/0086764 A1 * | 3/2014 | Stinessen | ............. | F04D 1/06 417/420 |
| 2014/0153159 A1 * | 6/2014 | Hazel | ............. | H02J 1/08 361/602 |
| 2014/0203640 A1 * | 7/2014 | Stinessen | ............. | H02J 3/22 307/31 |
| 2014/0217947 A1 * | 8/2014 | Haugan | ............. | H02M 7/219 318/503 |
| 2014/0232227 A1 * | 8/2014 | Ionel | ............. | B60W 10/105 310/103 |
| 2014/0326509 A1 * | 11/2014 | Hay | ............. | E21B 17/003 175/57 |
| 2016/0341281 A1 | 11/2016 | Brunvold et al. | | |
| 2018/0034356 A1 * | 2/2018 | Urch | ............. | B60L 58/12 |

FOREIGN PATENT DOCUMENTS

| | | | | |
|---|---|---|---|---|
| WO | WO-2013131008 A1 * | 9/2013 | ............. | H02K 16/02 |
| WO | 2015064853 A1 | 5/2015 | | |
| WO | WO-2015170991 A1 * | 11/2015 | ............. | H02J 3/00 |

* cited by examiner (A-A')

(B-B')

(C-C')

LONG DISTANCE POWER TRANSMISSION WITH MAGNETIC GEARING

TECHNICAL FIELD

The present disclosure relates to long distance power transmission with magnetic gearing. More particularly, the present disclosure relates to systems using long distance, low frequency power transmission, such as subsea systems that make use of magnetic gearing with rotating machinery.

BACKGROUND

When operating a single electric motor in a remote location, such as a subsea pump or compressor, the electrical power can be transmitted from an adjustable speed drive located topside (e.g. above the sea surface) to the remote location. When the distance between the topside adjustable speed drive and the remote location is long, high voltages and low frequencies can be used to reduce electrical power losses. However, in some cases the load (e.g. pump or compressor) relies on a relatively high rotational speed in order to be effective. In some cases, the rotational speed required by the pump or compressor is higher than the synchronous speed at which the electrical motor can provide when driven by the low frequency transmitted power. Thus in many cases there can be a trade off between: (1) tie-back distance over which the power is transmitted; (2) power and voltage losses due to the tie-back distance; and (3) desired load shaft speeds for the remote machinery.

One solution is to use a mechanical gear system at the remote location to increase the rotational speed from the electric motor driven by the low frequency transmitted power to a level that can be effectively used by the remote equipment. However, the power losses due to the mechanical gear system may be too great. This is especially true where the remote location is subsea, since the rotating equipment often needs to be liquid filled. In such cases, the liquid-filled mechanical gear systems may have unacceptable viscous losses. An alternative to a mechanical gear system is an in-series configuration of motor-generator-motor. For example, a two-pole motor can be directly mechanically coupled to an eight-pole generator. The output frequency from the generator would be four times greater than the supply frequency. By connecting a normal two pole pump motor to the generator output, the required pump speed can be achieved. This type of solution does, however, introduce two rotating electrical machines subsea, in addition to the ordinary pump motor. The resulting overall system is therefore much larger in size. For further details see, e.g. Intl. Patent Publ. No. WO 2013/039404 A1.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, a system for powering a subsea rotating machine is described. The system includes elements at both a surface facility and a subsea location. At the surface facility an electrical power supply is configured to supply multi-phase high-voltage low-frequency alternating-current electrical power. A power transmission cable runs between the power supply and the subsea location. At the subsea location, a subsea motor is configured to convert the low-frequency electrical power into torque on a motor output element thereby causing the motor output element to rotate at a drive rotational frequency rotation. A subsea magnetic gear module is also at the location and includes: a first rotating element mechanically coupled to the motor output element; and a second rotating element mechanically coupled to an output shaft. The first and second rotating elements are magnetically coupled to each other such that torque from the motor output element rotating at the drive rotational frequency is converted to torque on the output shaft rotating at a working rotational frequency. An effective gear ratio of the subsea magnetic gear module can be defined as the ratio of the working rotational frequency to the drive rotational frequency, which according to some embodiments, is greater than one. Also at the subsea location is a subsea rotating machine that is mechanically coupled to the output shaft and configured to use the torque on the output shaft at the working frequency to operate the rotating machine.

According to some embodiments, the subsea magnetic gear module is liquid filled and includes a plurality of permanent magnets on the first, second and/or other rotating elements. According to some embodiments, the subsea magnetic gear module is configured such that its effective gear ratio is 2:1, 3:1, 4:1, 6:1 or higher, or other intermediate values. The gear motor cable can be at least 20 kilometers in length between the power supply and the subsea location. According to some embodiments, this distance can be more than 20, 50, 100 or 200 kilometers. According to some embodiments, the low-frequency alternating-current electrical power is at most 30 hertz. In some examples it is 20 Hz or 16⅔ Hz.

The electrical power supply can include a step-up transformer and the subsea location can include a step down transformer configured to reduce voltage of the low-frequency electrical power for use by the subsea motor. Examples of the rotating machine type include: pump, compressor and separator. According to some embodiments, the subsea rotating machine is configured to process a hydrocarbon bearing fluid produced from a subterranean reservoir.

According to some embodiments, the surface power supply is configured to adjust the voltage and frequency of the electrical power, and the subsea magnetic gear module is configured such that a ratio of the working frequency to the drive frequency is fixed. In such cases, the subsea magnetic gear module can include an outer stationary housing having a plurality of alternating polarity permanent magnet pieces mounted thereon, the first rotating element can include a plurality of magnetic and non-magnetic material pieces alternatingly mounted therein, and the second rotating element can include a plurality of alternating polarity permanent magnet pieces mounted thereon.

According to some embodiments, the surface power supply is configured to supply the electrical power at a fixed low-frequency and the subsea magnetic gear module is configured such that the effective gear ratio is adjustable. In such cases, the subsea motor can be configured such that the drive frequency is fixed, and a variable speed drive located at the subsea location is configured to supply variable frequency electrical power to a plurality of stator windings in the subsea magnetic gear module to create rotating magnetic fields. The rotating magnetic fields can be used to rotate a variable electric motor element at a variable motor frequency. The subsea magnetic gear module may be configured to combine (e.g. sum) the rotation of the variable electric motor element with the rotation of the motor output element to rotate the output shaft at the working rotational frequency. In some cases, the sum is multiplied by an inherent, built-in, effective magnetic gear ratio which can be 2:1, 3:1, 4:1, 5:1, 6:1 or more or some other intermediate value. According to some embodiments, the rotating magnetic fields can at times rotate the variable electric motor element in a direction opposite to the rotation of the first rotating element and the motor output element. When the variable electric motor element and the first rotating element rotate in opposite directions, energy can be generated by the stator windings and then used to partially power the subsea motor. According to some embodiments, the subsea magnetic gear module is liquid filled and includes the variable electric motor element, and at high values of working frequency the variable electric motor element and the first and second rotating elements all rotate in the same direction such that viscous losses are reduced when compared to cases where some of the elements contra-rotate. According to some embodiments, the stator windings create rotating magnetic fields that directly interact with magnetic material in the first rotating element thereby rotating the output shaft at the working rotational frequency.

According to some embodiments, a method of powering a subsea rotating machine is described. The method includes supplying low-frequency high-voltage electrical power from a surface facility through a power transmission cable to a subsea location. At the subsea location: a subsea motor uses the low frequency power to rotate a motor output element at a drive frequency; the drive frequency is stepped-up to a higher working frequency on an output shaft using a subsea magnetic gear module that includes a plurality of rotating elements and a plurality of permanent magnet pieces; and the rotating output shaft is used to operate the rotating machine at the higher working frequency.

According to some embodiments, a system for transmitting low frequency electrical power over long distances is described. The system includes: a long distance power transmission cable at least 20 kilometers in length; and an electrical transducer electrically connected to one end of the power transmission cable with a rotating element configured to rotate synchronously with the frequency of power transmitted over the transmission cable. A magnetic gear module is mechanically coupled to the electrical transducer and includes: a first rotating element mechanically coupled to the rotating element of the transducer; and a second rotating element mechanically coupled to a shaft, the first and second rotating elements being magnetically coupled to each other such that a first rotational speed and a second rotational speed of the rotating element of the transducer are related to each other. According to some embodiments, the shaft can be mechanically coupled to a rotating machine that can be of a type selected from the following: wind turbine, water turbine, pump, compressor and separator.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
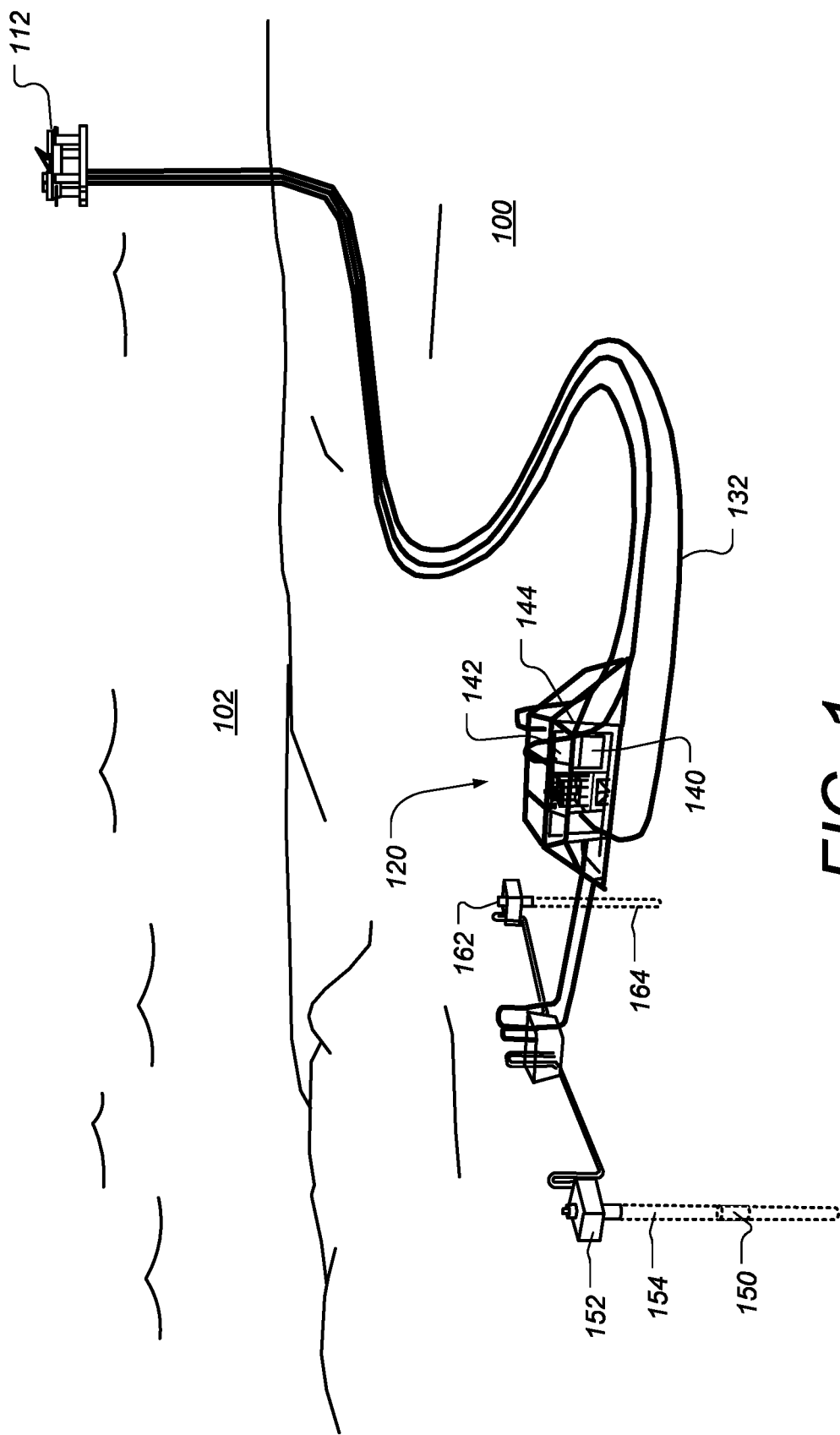
FIG. 1 is a diagram illustrating a subsea environment in which magnetic gearing can be used in connection with long distance power transmission, according to some embodiments.

One or more specific embodiments of the present disclosure will be described below. The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to." Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name, but not function.

According to some embodiments, techniques are described for power transmission from an adjustable speed drive located topside to a single motor in a remote location, typically a subsea pump or compressor. The techniques combine power transmission at high voltage and low frequency to a pump that makes use of a rotational speed that is higher than the synchronous speed at which a two pole induction or permanent magnet (PM) motor can provide. A magnetic step-up gear is used to multiply the load shaft speed by a given ratio. The "gear" ratio of the magnetic gear system can be selected to suit the application.

According to some embodiments, a system is described that uses magnetic gearing principles in a novel way to overcome challenges and limitations in conventional subsea power transmission systems. Some challenges in conventional solutions are related to power and voltage loss due to increasing tie-back distance. Further, the relatively high frequency used to achieve the desired load shaft speed limits the step-out distance due to added reactive voltage drop and resistive losses caused by the skin effect. The receiving-end voltage regulation becomes poor due to Ferranti effect that limits the ability to control the receiving-end voltage with varying load.

According to some embodiments, by transmitting the power at low frequency and increasing the load shaft speed locally using a magnetic step-up gear, the step-out distance can be increased significantly, while reducing the negative effects described above. The system according to some embodiments has the following features: (1) reducing the power transmission frequency limits the effects of added AC reactance and cable resistance due to the skin effect; (2) the low transmission frequency limits the consequence from Ferranti effect on the load related voltage regulation; (3) long step-out distance become practical due to low transmission frequency and high transmission voltage; (4) step-up and step-down transformers are used to provide high voltage transmission; and (5) using a subsea step-up magnetic gear system, the output shaft speed can be optimized to fit the load speed requirements.

According to some embodiments, the magnetic gear system has smooth surfaces that limit viscous losses and avoid undesirable displacement or pumping effects associated with conventional liquid-submerged mechanical gear systems.

In applications where multiple receiving-end loads are in a remote location, and it is desirable to operate each load with its own individual and adjustable speed, conventional topside systems and umbilicals are relatively complicated and may be impractical. According to some other embodiments, techniques are described for transmitting power from a topside-located fixed-frequency source to one or more pump or compressor loads in a remote location, such as a subsea pumping station. High voltage and low fixed frequency electrical power is transmitted to one or more pumps that rely on rotational speeds that are higher than the synchronous speed at which a two pole induction or PM motor can achieve at the low transmission frequency. In order to achieve adjustable speed, according to some embodiments, the magnetic gear system includes a speed control motor (SCM). The main drive motor operates at fixed, relatively low rotational speed. The SCM, which might be integrated with the magnetic gear, operates at variable speed by means of a local adjustable speed drive (ASD). A PM step-up gear with an adjustable gear "ratio" might be used to multiply the load shaft speed by a variable ratio. The effective gear ratio can be selected to suit the application.

According to some embodiments, systems are described that include the following features: (1) a single power supply cable feeding several pumps in one remote location; (2) electrical power is supplied at fixed low frequency from topside to remote (e.g. subsea) location; (3) long step-out distances are possible due to low fixed frequency and high transmission voltage; (4) the majority of the load power is supplied by an external induction, reluctance or PM motor operating at low fixed speed; (5) a minority of the load power is supplied by an integrated relatively small variable speed torque motor; and (6) a variable speed output shaft provides the sum of the power from the main fixed speed motor and the variable speed torque motor to the load.

FIG. 1 is a diagram illustrating a subsea environment in which magnetic gearing can be used in connection with long distance power transmission, according to some embodiments. On sea floor 100 a subsea station 120 is shown which is downstream of several wellheads being used in this example to produce hydrocarbon-bearing fluid from a subterranean rock formation. Station 120 includes a subsea pumping module 140, which is powered by an electric motor such as an induction motor or permanent magnet motor. The station 120 is connected to one or more umbilical cables, such as umbilical 132. The umbilicals in this case are being run from a surface platform 112 through seawater 102, along sea floor 100 and to station 120. In other cases, the umbilicals may be run from some other surface facility such as a floating production, storage and offloading unit (FPSO), or a shore-based facility. The distance between platform 112 and station 120 is referred to as the "step out" distance. In this case the step out distance might be relatively large, for example greater than 30 kilometers. In some cases the step out distance might be greater than 50 km, and in some cases the step out distance might be 200 km or more. The umbilical 132 can also be used to supply barrier and other fluids, and control and data lines for use with the subsea equipment in station 120. Although a pumping module 140 is shown in FIG. 1, according to some embodiments the module 140 can be configured for other subsea fluid processing functions, such as a subsea compressor module and/or a subsea separator module. In embodiments described herein, it is understood that references to subsea pumps and pumping modules can alternatively refer to subsea compressors and compressor modules. Furthermore, references herein to subsea pumps and subsea compressors should be understood to refer equally to subsea pumps and compressors for single phase liquids, single phase gases, or multiphase fluids. According to some embodiments, the subsea magnetic gear system described herein is used in connection with an electrical submersible pump (ESP) 150 which can either be located downhole, as shown wellbore 154 in FIG. 1 or in a subsea location such as on the sea floor in a christmas tree at a wellhead 152 or other equipment. Thus in embodiments described herein, it is understood that references to subsea pump and pumping modules can alternatively refer to ESPs whether deployed downhole or in a subsea location.

According to some embodiments, the further pumping modules 142 and 144 are included in station 120 and might also be driven by electrical power from platform 112 via umbilical 132. The pumping modules 142 and 144 may be used, for example, to pump fluids from other wells such as well 164 via wellhead 162. In cases where it is desirable to run the pumping modules 140, 142 and 144 at different speeds, they can be driven by separate electric motors within station 120.

Referring to embodiments where there is a single remote pumping module 140 in subsea station 120, an adjustable frequency drive (AFD) is located on platform 112. The AFD transmits power through umbilical 132 at various frequencies to an electric motor that directly drives the subsea pump. Challenges arise as the step-out distance between the platform 112 and station 120 increases. Many pump and compressor applications require relatively high speed for optimum operation and efficiency. With ordinary motors, being either synchronous or asynchronous, the motor speed is directly related to the supply frequency.

A typical conventional drive system for subsea pumps and compressors uses a two-pole induction motor operating at nominal speeds between about 3000 rpm and 6000 rpm. This speed range corresponds to a transmission frequency of about 50 Hz to 100 Hz, depending on the power rating and particular application. The step-out distance from the surface AFD to the subsea pump motor might be below about 15 km-20 km. Most conventional subsea pumps and compressors are direct driven, i.e. the motor and pump shafts have the same rotational speed. Since the motor speed is closely linked to the supply frequency, higher speed means higher transmission frequencies.

Figure 2:
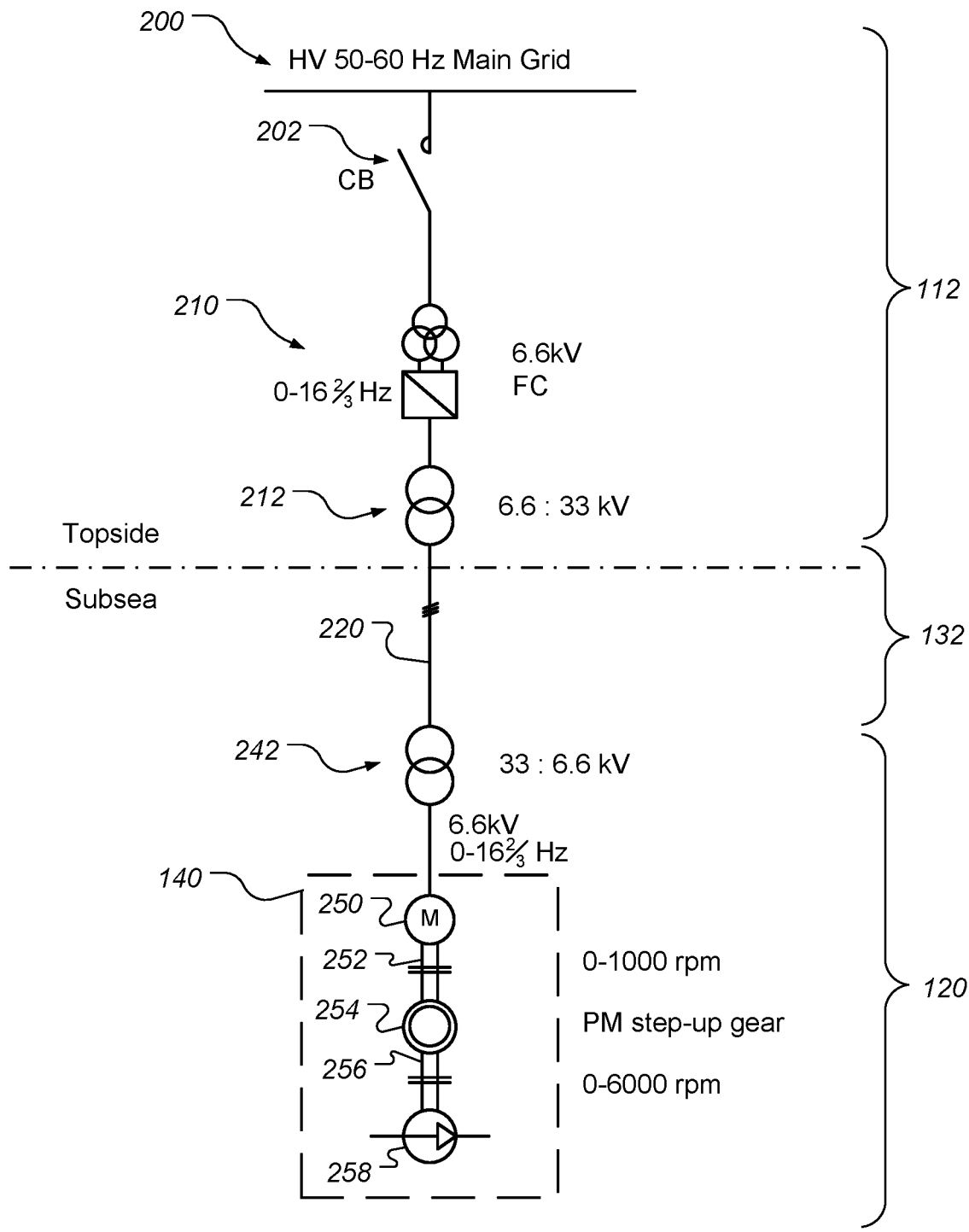
FIG. 2 is a schematic diagram of a single remote pump in subsea location being driven by a surface-located adjustable frequency drive (AFD), according to some embodiments.

FIG. 2 is a schematic diagram of a single remote pump in subsea location being driven by a surface-located adjustable frequency drive (AFD), according to some embodiments. AFD 210 is located on surface platform 112. The AFD 210 is connected to high voltage main grid 200 via circuit breaker 202. In one example, main grid 200 is at 50 Hz and AFD 210 is configured to supply variable power from 0 to 16⅔ Hz at 6.6 kV. In cases where the main grid is 60 Hz the AFD can be configured to supply power from 0 to 20 Hz, for example. The power from AFD 210 is routed through a step-up transformer 212 that is configured to increase the voltage from 6.6 kV to 33 kV. Conductors 220 run through umbilical 132 and, according to some embodiments, is 30 to over 200 kilometers in length. In the subsea station 120, the power from conductors 220 is routed through step-down transformer 242 that reduces the voltage from 33 kV to 6.6 kV. The power is then used to drive electric motor 250. The 0 to 16⅔ Hz power translates to 0-1000 rpm in the electric motor 250. Motor 250 is connected via shaft 252, which may include a coupling, to PM step-up gear 254. The PM gear 254 in this example has a fixed 6:1 step up ratio such that shaft 256, which also may include a coupling, is driven at 0-6000 rpm. Shaft 256 is used to directly drive pump 258.

For long distances between the AFD 210 and the pump module 140, significant challenges may arise from voltage and power loss in the transmission lines. A large part of the transmission losses are related to the power frequency. The inductive voltage drop is proportional to the supply frequency and the resistive loss is closely related to the skin-effect cause by the frequency induced current displacement in the conductors. If the transmission frequency is kept very low and the transmission voltage high, the step-out distance can be increased several times with limited voltage and power loss.

With reduced transmission frequency over conductors 220, the rotational speed of motor 250 will be reduced proportionally. A higher output speed from a motor supplied from a power source with low frequency can be obtained using a mechanical step-up gear between the low-speed motor and the high-speed pump shaft. However, a subsea mechanical gear has a limited efficiency due to viscous losses when operated completely submerged in a barrier fluid. Further, mechanical gears are also prone to wear and tear over time, and cannot be expected to have a lifetime of 25 years of continuous operation without service.

According to some embodiments, a planetary or epicyclical step-up gear system is used instead of PM step-up gear 254. For further details on subsea epicyclical gearing, refer to U.S. patent application Ser. No. 14/715,514, which is incorporated herein by reference.

According to some embodiments, power is transmitted from the remotely located AFD 210 over a long distance through conductors 220 to the subsea station 120 at a low frequency, while still running the pump at desirable speed in the range of about 3000 to 6000 rpm without the use of a traditional mechanical gear. According to some embodiments, the system combines the use of a low speed motor with a long tie-back cable and adjustable low frequency power supply. The adjustable frequency will normally be provided by a static frequency converter located topside such as AFD 210 in FIG. 2. The low speed motor 250, which can be an induction motor, reluctance motor or permanent magnet type, will typically have two poles and will be combined with PM step-up gear 254.

In the example shown in FIG. 2, motor 250 has one pole-pair and rotates at 1000 rpm when the supply frequency is 16⅔ Hz. Magnetic step-up gear 254 might have a ratio of 1:6, which drives pump 258 at a full speed of about 6000 rpm. With this example system, the speed of motor shaft 252 is adjusted by controlling the frequency and voltage at the sending end of the transmission conductors 220. This embodiment provides the ability to reduce losses related to step-out length and transmission frequency in order to achieve a longer step-out distance compared to a system operating at a frequency directly related to the synchronous speed of the motor/pump rotor.

Figure 3:
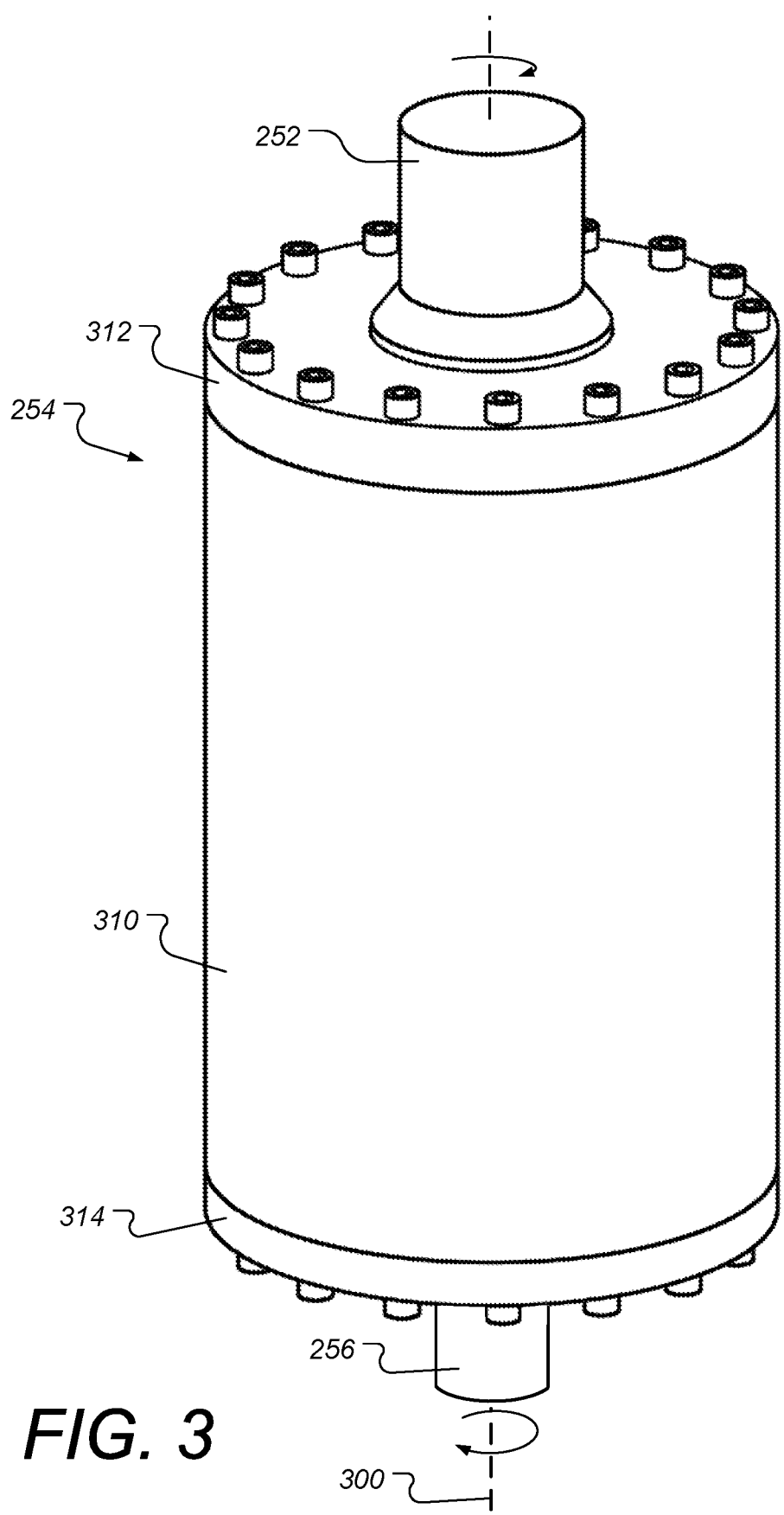
FIG. 3 is a perspective view of a permanent-magnet liquid-filled step-up gear, according to some embodiments.

FIG. 3 is a perspective view of a permanent-magnet liquid-filled step-up gear, according to some embodiments. PM gear 254 has an outer housing that includes outer shell 310, upper end piece 312 and lower end piece 314. The gear includes two shafts, namely input shaft 252 and output shaft 256. In the case of FIG. 3, the PM gear is configured as a step-up gear, such that rotating the input shaft 252 one full revolution about axis 300 results in more than one full rotation of output shaft 256 about axis 300. According to some embodiments, the gear ratio, the ratio of input shaft rotations (or rpm) to output shaft rotations (or rpm), is 1:6. Note that other gear ratios can be configured as will be discussed in greater detail, infra. Note also that the gear 254 can also be configured as a step-down gear, such that one revolution of the input shaft results in less than one revolution of the output shaft.

Figure 4:
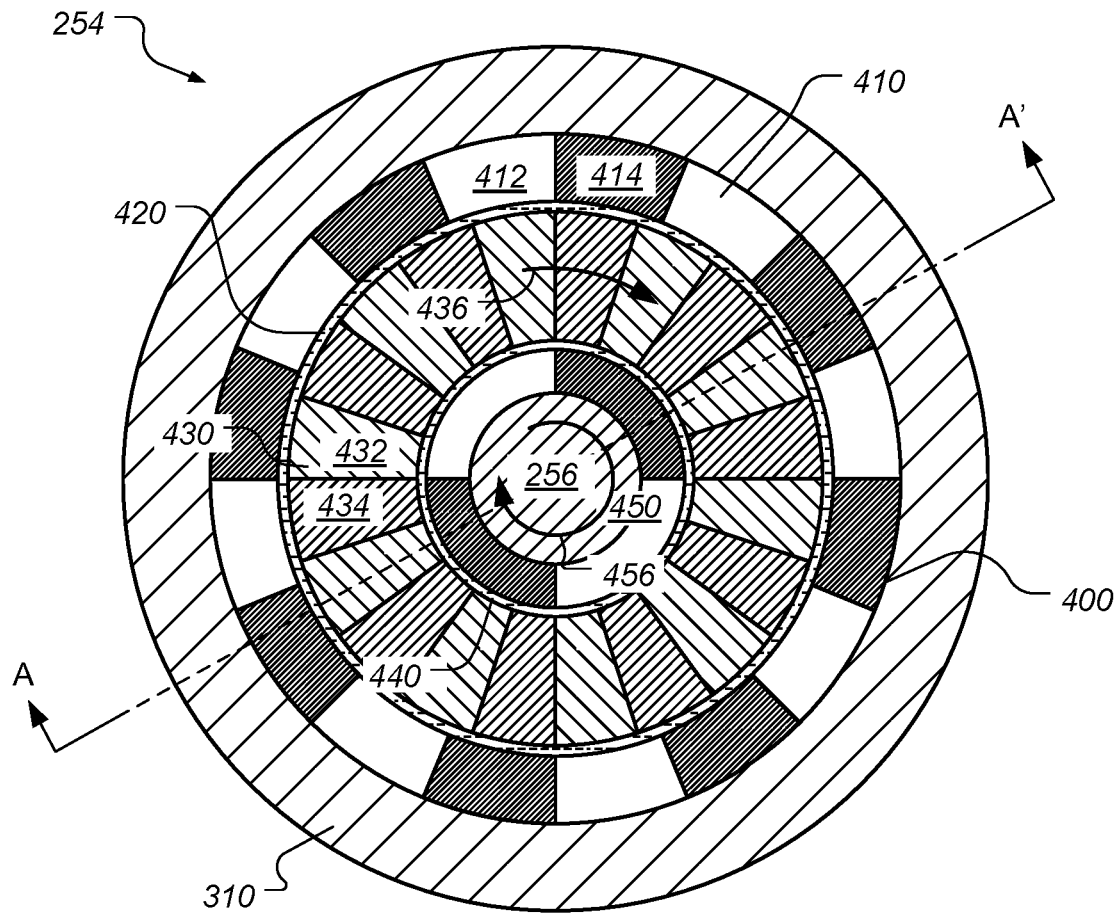
FIG. 4 is a cross-section of a permanent-magnet liquid-filled step-up gear, according to some embodiments.

FIG. 4 is a cross-section of a permanent-magnet liquid-filled step-up gear, according to some embodiments. The outer shell 310, which remains stationary, includes a plurality of magnetic north and magnetic south permanent magnets 410 arranged along the inner surface of shell 310. Magnetic south piece 412 and magnetic north piece 414 are labeled in FIG. 4. The combination of outer shell 310 and permanent magnets 410 make up the magnetic gear stator 400. In the example shown, there are 16 permanent magnet pieces alternatingly arranged on stator 400. Within stator 400 is a pole piece rotor 430 that is made up of alternating sections of magnetic material and non-magnetic material. Labeled in FIG. 4 are non-magnetic material 432 and magnetic material 434. According to some embodiments, the magnetic material may be magnetic sheet steel and the non-magnetic material may be polymer. In the example shown, there are 20 alternating pieces of magnetic and non-magnetic material in pole piece rotor 430 (i.e. 10 pieces of each material). Pole piece rotor 430 is fixedly mounted to input shaft 254 (shown in FIG. 3) which rotates pole piece rotor 430 as shown by arrow 436. Between stator 400 and pole piece rotor 430 is narrow space 420 that filled with barrier fluid. Within pole piece rotor 430 is magnetic gear rotor 450. The outer portion of rotor 450 includes a plurality of alternative magnetic north and magnetic south pieces as shown, while the inner portion of magnetic gear rotor 450 is the output shaft 256. In the example shown, magnetic gear rotor 450 includes four permanent magnet pieces. Through the interaction of the magnetic fields and rotation of pole piece rotor 430, the magnetic gear rotor 450 is rotated as shown by arrow 456. Between pole piece rotor 430 and magnetic gear rotor 450 is a narrow space 440 that is filled with barrier fluid. Note that since the PM gear 254 is part of a subsea rotating machine, the housing is completely filled with a barrier fluid and the pressure is compensated relative to the surrounding ambient and/or process pressure. Note that a conventional mechanical gear would suffer from significant viscous losses, mainly caused by viscous shear loss and fluid displacement between the teeth at the high speeds required. By the using permanent magnets (PM), the rotating members 430 and 450 of PM step-up gear 254 can be made with smooth surfaces that minimize the viscous shear and eliminate displacement losses. In particular, the inner surface of stator 400, the inner and outer surfaces of pole piece rotor 430 and the outer surface of magnetic gear rotor 450 are all very smooth so as to minimize such losses.

Figure 5:
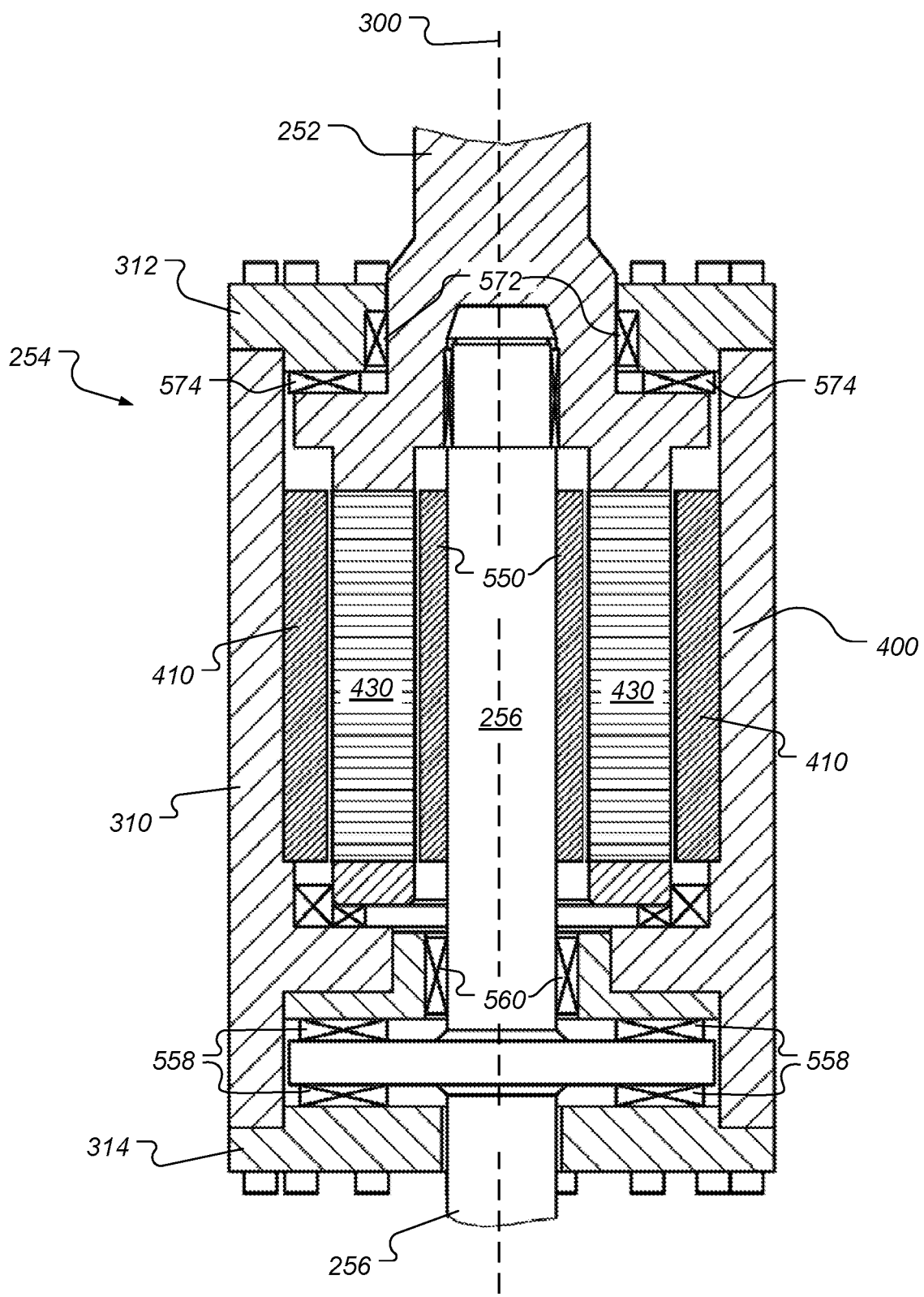
FIG. 5 is a cross section along the A-A' of the permanent-magnet liquid-filled step-up gear shown in FIG. 4.

FIG. 5 is a cross section along the A-A' of the permanent-magnet liquid-filled step-up gear shown in FIG. 4. In FIG. 5 it can be seen that input shaft 252 is fixedly attached to pole piece rotor 430 using a flanged portion. Also visible are two permanent magnet pieces 550 that are fixedly attached to output shaft 256 which make up a portion of magnetic gear rotor 450 (visible in FIG. 4). The axial and radial alignment of the various rotating members might be maintained using a number of bearings. In the case of input shaft 252 and pole piece rotor 430, bearings 572 and 574 are labeled and in the case of output shaft 256 and magnetic gear rotor 450 bearings 558 and 560 are labeled. Note that other bearings are shown but not labeled and other bearings are not shown for purposes of clarity. Furthermore, the internal volumes of PM gear 254 might be filled with barrier fluid although it is not shown in FIG. 5 for purposes of clarity.

With the development of rare earth magnets, which might be used in PM gear 254, significant torque can be transferred over a relatively large gap without mechanical contact. By replacing parts of the gap with magnetically soft pole pieces, with a pole number different from the external stator PM pole number and a PM rotor with a lower pole number than the stator pole number, a "gear ratio" between the two can be achieved. By selection of the individual pole numbers, the pole piece rotor 430 and the internal magnetic gear rotor 450 can be made to rotate in the same direction. Rotation of the different rotating members 430 and 450 in the same direction enables keeping the relative movement between the different rotating members low, which limits viscous losses.

In the case of PM gear 254, the multi-pole PM stator 400 might be kept stationary while the passive pole-piece rotor 430 is coupled to an external low speed motor 250 (shown in FIG. 2) via a rotating input shaft 252. The inner high speed magnetic gear rotor 450 drives output shaft 256 which is coupled to the driven pump or compressor 258 (also shown in FIG. 2).

According to some embodiments, the gear ratio of the magnetic gear is given by the following equation:

$$n_{shaft} = n_{PPC} * N_{stator} / N_{Rotor}$$

Where: $n_{shaft}$ is speed of output shaft (e.g. shaft 256); $n_{PPC}$ is speed of pole piece rotor (e.g. shaft 252); $N_{stator}$ is the number of PM poles in stator (e.g. stator 400); and $N_{Rotor}$ is number of PM poles in magnetic gear rotor (e.g. rotor 450). The direction of the output shaft will be the same direction as the pole piece carrier shaft if the number of pole pieces in the pole piece rotor (e.g. rotor 430) are the sum of $N_{stator}$ and $N_{Rotor}$ or in opposite direction if the number of pole pieces is the difference between $N_{stator}$ and $N_{Rotor}$.

The magnetic gearing by means of intermediate passive poles are referred to as second, third and fourth order magnetic gears depending on the magnetic and drive shaft configuration complexity.

According to some embodiments, the PM gear 254 is configured as a fixed "gear" ratio in the range 1:1.6 to 1:6. For example, if the external motor 250 is operated at 50 Hz and 1:1.6 ratio will produce an inner rotor output speed of about 4800 rpm and operated at 16⅔ Hz and 1:6 ratio will produce an inner rotor output speed of about 6000 rpm. According to some embodiments, other gear ratios and motor speeds can be provided.

According to some embodiments, a variable ratio PM gear can be used instead of, or in addition to a fixed PM gear. When there is a combination of long step-out distance and multiple motors/pumps in a single location that are each driven at different speeds, the traditional one-to-one power transmission configuration becomes both expensive and unpractical. In addition, long step-out distances give rise to significant challenges from voltage and power loss in the transmission cable.

Figure 6:
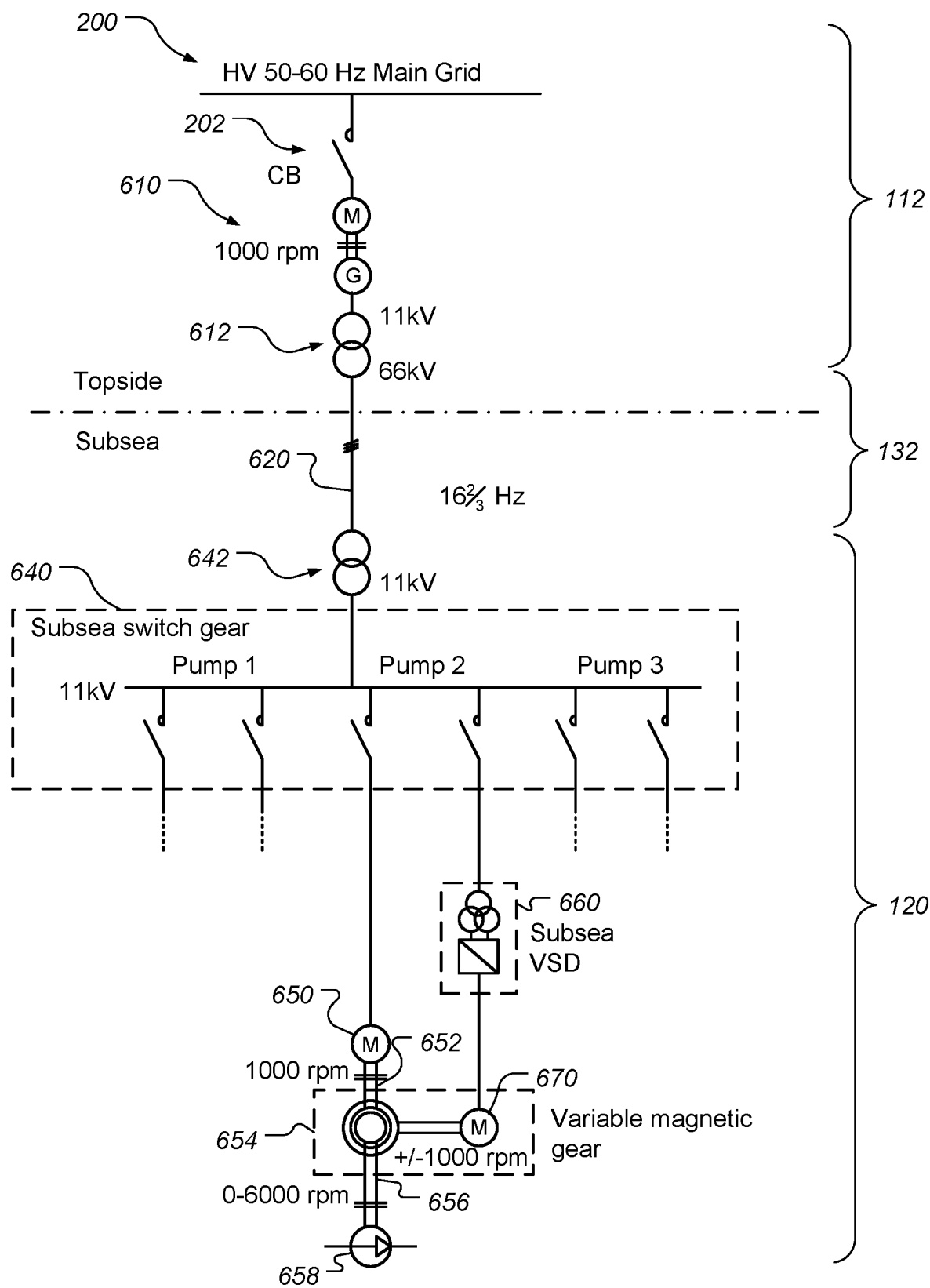
FIG. 6 is a schematic diagram of multiple remote pumps in subsea location being driven by a surface-located fixed frequency drive and subsea variable magnetic gearing, according to some embodiments.

FIG. 6 is a schematic diagram of multiple remote pumps in subsea location being driven by a surface-located fixed frequency drive and subsea variable magnetic gearing, according to some embodiments. A single 3-phase high voltage (HV) cable feeder 620 might be used between a surface platform 112 and remote located subsea station 120. Using such an arrangement with a single 3-phase HV feeder in umbilical 132 to drive provides a cost effective power transmission system for multiple remote pumps. A large part of the transmission losses are related to transmission voltage and power frequency. The inductive voltage drop is proportional to the supply frequency and the resistive loss is closely related to the skin-effect caused by the frequency induced current displacement in the conductors. Also, the Ferranti effect is frequency dependent and will give rise to negative voltage regulation when a combination of long cable, high voltage and high frequency is applied.

When the transmission frequency is kept low and constant, without going to DC transmission, the step-out distance can be increased several times with minimum voltage and power loss, while the Ferranti effect is limited. A driver for using low frequency and not DC is the ability to use step-up and step-down transformers. This means that conventional power electronics components can be used to convert the low frequency HV transmitted power to low frequency, medium-voltage (MV) power suitable for driving a variable speed motor in the subsea location.

A fixed-frequency drive (FFD) 610 is located on surface platform 112. The FFD 610 is connected to high voltage main grid 200 via circuit breaker 202. In one example, main grid 200 is at 50 Hz and FFD 610 is configured to supply fixed frequency power at 16⅔ Hz at 11 kV. The power from AFD 610 is routed through a step-up transformer 612 that is configured to step up the voltage from 11 kV to 66 kV. Conductors 620 run through umbilical 132 and, according to some embodiments, are about 30 to over 200 kilometers in length.

As part of the subsea station 120, a single step-down power transformer 642 might be used to reduce the transmission voltage to a suitable MV distribution level, e.g. 11 kV. The MV distribution side might include a switch gear unit 640 that has several feeders. Each pump, compressor, or other load might require two feeders. The two feeders provide the functionality for starting, operating and fault clearing for each of the pumps (or other loads). In the example shown in FIG. 6, only the two feeders for "Pump 2" are shown for clarity although the other pumps may have similar or identical components. One feeder is connected to subsea VSD 660, while the other feeder is connected to fixed speed drive motor 650. Subsea VSD 660 is used to generate a variable frequency that will determine the ultimate drive speed for pump 658. Within magnetic variable-ratio (MVR) gear 654, fixed speed drive motor 650 is driven by the fixed frequency of the feeder from switch gear 640. According to some embodiments, the fixed frequency may be 16⅔ Hz. The motor converts the fixed frequency power to a fixed speed rotation in input shaft 652 to MVR gear 654. A second variable speed motor 670, driven by VSD 660, is included within MVR gear 654. As will be described in further detail, infra, the MVR gear 654 combines the fixed drive speed from fixed drive motor 650 with variable speed from variable motor 670 to rotate output shaft 656 at a variable speed from 0-6000 rpm in this example.

Figure 7:
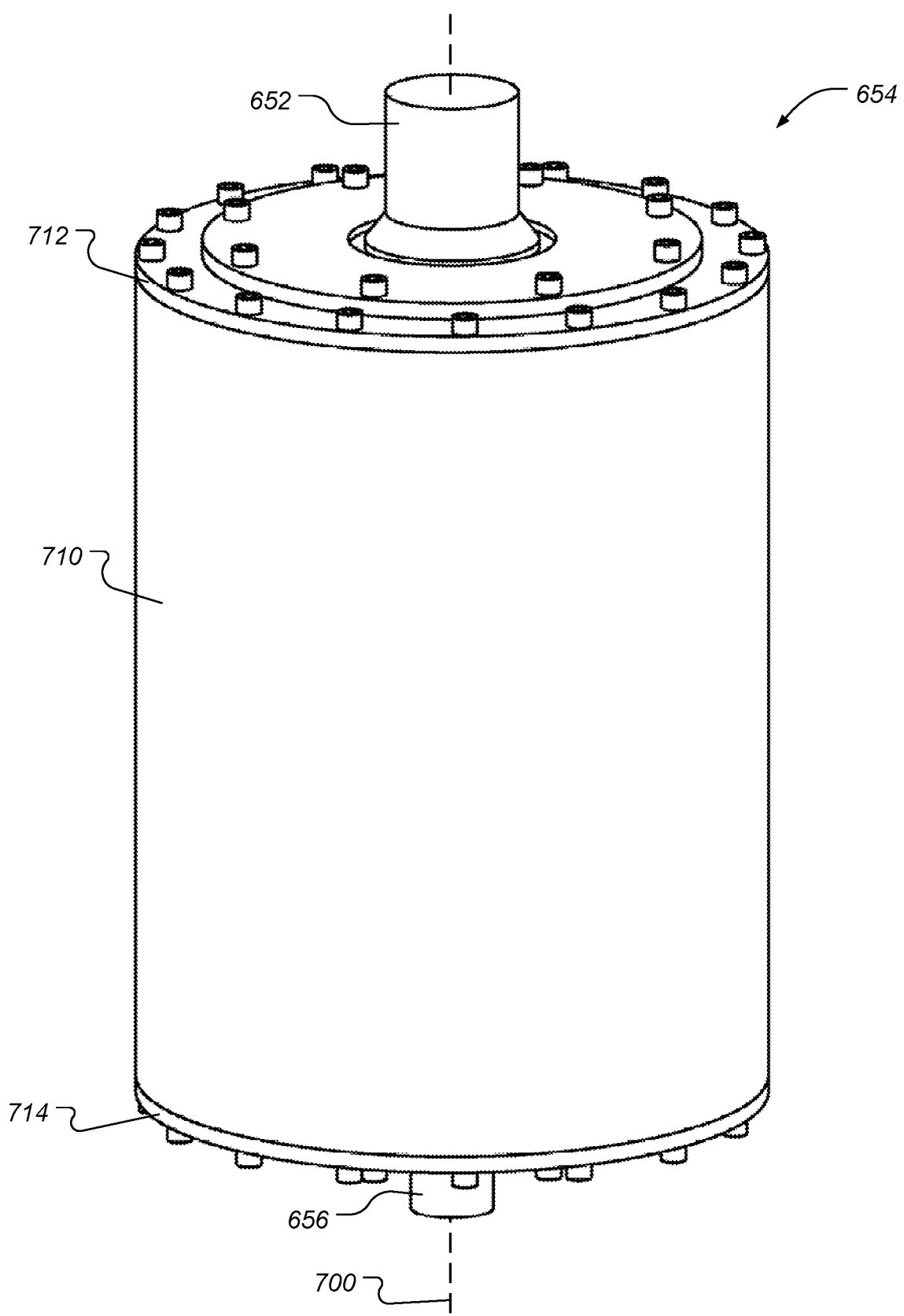
FIG. 7 is a perspective view of a liquid-filled variable magnetic gear, according to some embodiments.

FIG. 7 is a perspective view of a liquid-filled variable magnetic gear, according to some embodiments. MVR gear 654 has an outer housing that includes outer shell 710, upper end piece 712 and lower end piece 714. MVR gear 654 includes two shafts that rotate about central axis 700: fixed-speed input shaft 652; and variable-speed output shaft 656. MVR gear 654 uses a magnetic gear principle that is similar to the principle of PM gear 254 shown and described with respect to FIGS. 2-5, supra. MVR gear 654 uses rare earth magnets to transfer significant torque over a relatively large gap without mechanical contact. In the gap, magnetically soft pole pieces might be used and the number of poles in the various components can be selected to achieve the desired "gear ratio."

Figure 8:
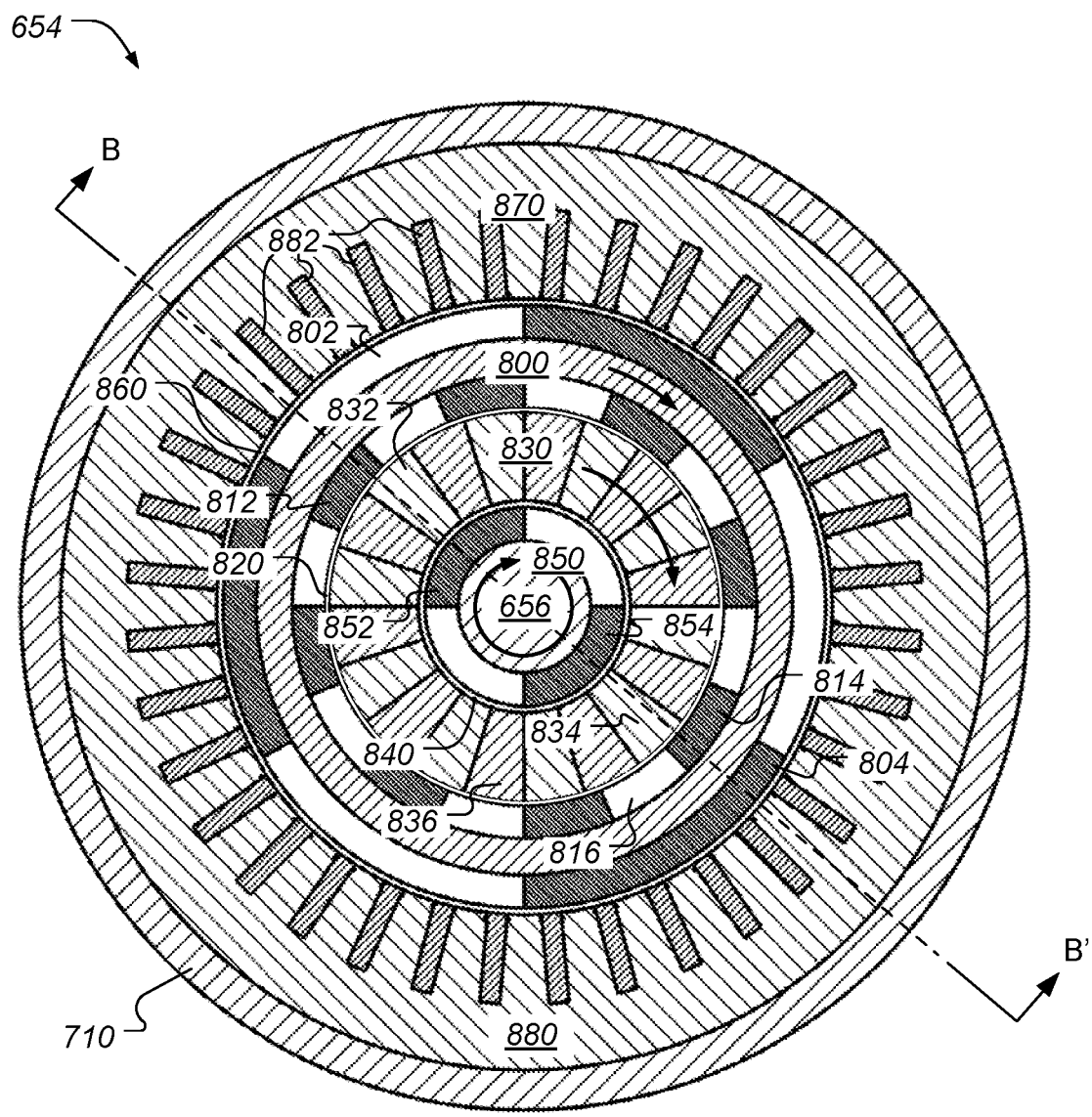
FIG. 8 is a cross-section of a liquid-filled variable magnetic gear, according to some embodiments.

FIG. 8 is a cross-section of a liquid-filled variable magnetic gear, according to some embodiments. This inner structure is similar or identical to PM gear 254 shown and described with respect to FIGS. 2-5, supra. The output shaft 656 forms part of variable magnetic gear rotor 850. The outer portion of rotor 850 includes a plurality of alternative magnetic north pieces 852 and 854, and magnetic south pieces as shown, while the inner portion of magnetic gear rotor 850 is the output shaft 656. Pole piece rotor 830 surrounds magnetic gear rotor 850 and might be made up of alternating sections of magnetic material and non-magnetic material. Labeled in FIG. 8 are non-magnetic material pieces 832 and 834 and magnetic material piece 836. According to some embodiments, the magnetic material might be steel or another soft magnetic material and the non-magnetic material might be brass or another non-magnetic material. In the example shown there are 20 alternating pieces of magnetic and non-magnetic material in pole piece rotor 830 (i.e. 10 pieces of each material). Pole piece rotor 830 is fixedly mounted to fixed-speed input shaft 652 (shown in FIG. 7) that rotates pole piece rotor 830 as shown by the arrow. Between magnetic gear rotor 850 and pole piece rotor 830 is narrow space 840 that might be filled with barrier fluid. Outside of pole piece rotor 830 is speed control rotor 800. The inner surface of speed control rotor 800 includes 16 permanent magnet pieces with alternating polarity including magnetic north pieces 812 and 814 and magnetic south piece 816. The outer surface of speed control rotor 800 includes 6 alternating polarity pieces, including magnetic south piece 802 and magnetic north piece 804. Between speed control rotor 800 and pole piece rotor 830 is a narrow space 820 that might be filled with barrier fluid. Within outer shell 710 and outside of speed control rotor 800 is speed control stator 870 that includes a plurality of stator windings 882. Between speed control stator 870 and speed control rotor 800 is a narrow space 860 that is filled with barrier fluid.

Figure 9:
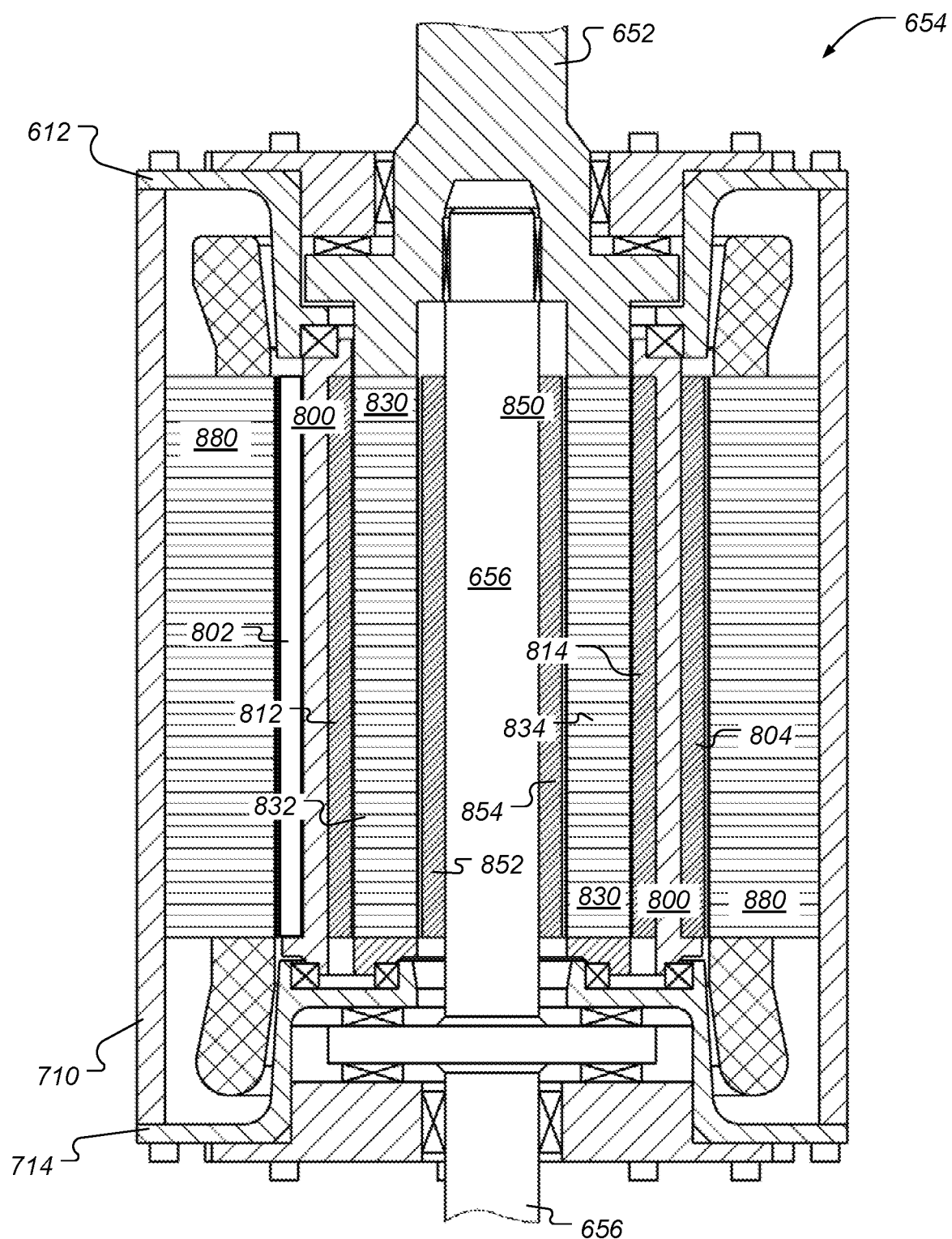
FIG. 9 is a cross section along the B-B' of the liquid-filled variable magnetic gear shown in FIG. 8.

FIG. 9 is a cross section along the B-B' of the liquid-filled variable magnetic gear shown in FIG. 8. In FIG. 9 it can be seen that input shaft 652 is fixedly attached to pole piece rotor 830 using a flanged portion. The axial and radial alignments of the various rotating members are maintained using a number of bearings as shown. Note that other bearings may be included but are not shown for purposes of clarity. Furthermore, the internal volumes of MVR gear 654 are filled with barrier fluid although it is not shown in FIG. 9 for purposes of clarity.

By selection of the individual pole numbers of the various components of MVR gear 654, the outer speed control rotor 800, the pole piece rotor 830 and the inner PM rotor 850 can be made to rotate in the same direction when operating at high rotational speeds. Rotation in the same direction reduces the relative speed between the different rotating members, which in turn limits viscous losses.

One example to conceptualize the design of MVR gear 654 is that a multi-pole PM "stator" might be configured as a rotating member, the speed control rotor 800. Attached to the external face of speed control rotor 800 is a second set of permanent magnets. These PMs, which are placed at a relatively large diameter, are in fact the active parts of the rotor of the variable speed motor 670. The speed control stator 870, with a 3-phase winding, is placed outside the speed control rotor 800, and also surrounds all the other rotating machine elements.

Magnetic gears based on intermediate passive pole pairs can be configured to rotate in the same or opposite direction relative to one another. For pressure compensation and other reasons, in subsea applications it might be desirable to fill the motor and magnetic gear assemblies with liquid (e.g. barrier fluid). The liquid might cause viscous loss when trapped between two surfaces with relative motion.

In the case of MVR gear 654 embodiments shown in FIGS. 6-9, the passive pole-piece rotor 830 might be coupled to external constant (low) speed motor 650 via rotating shaft 652 (both shown in FIG. 6). The inner high speed PM rotor 850 includes output shaft 656 that is coupled to the driven load. The direction of rotation of the output shaft 656 will be the same direction as the pole piece rotor 830 and input shaft 652, if the number of pole pieces are the sum of $N_{stator}$ and $N_{Rotor}$. The directions will be opposite if the number of pole pieces is the difference between $N_{stator}$ and $N_{Rotor}$.

Note that fixed speed drive motor 650 can be a conventional motor of induction, PM or other type, such as a reluctance motor. According to various embodiments, the external drive motor 650 can either be integrated with the MVR gear 654 or it can be a separate conventional motor that is mechanically coupled to the MVR gear 654. In the embodiments shown in FIGS. 6-9, the MVR gear 654 has an outer stator, the speed control stator (SCS) 870 with a number of poles that matches the synchronous speed of the external motor at a convenient frequency. The stator 870 might be equipped with a 3-phase winding to produce a controllable rotating magnetic field. The stator 870 and windings might be designed to produce nominal flux at a given frequency, which coincides with the rated speed of the external fixed speed motor 650. The SCS 870 is powered from a local VSD 660. According to some embodiments, the VSD 660 is configured for operation in at least two quadrants in order to run in both rotational directions and to both source and sink energy to and from the SCS 870. In this way, the VSD 660 acts as a gear-ratio controlling device, and it also contributes to the total power conversion of the unit.

The SCS 870 interacts with a speed control PM rotor (SCR) 800, which might be free to rotate with no mechanical shaft to tap off or feed in mechanical energy. Concentrically inside the SCR 800 is a passive pole rotor (PPR) 830, with a pole number that gives a "gear" ratio to produce the required output speed of the inner high-speed output rotor (HSR) 850. As can be seen in embodiments of FIG. 9, the PPR 830 might be coupled to and rotate with the main motor drive shaft 652. This design will have a "gear" ratio in the range from 1:2 to 1:6. The three rotating members 800, 830 and 850 in the in MVR gear 654 act similarly to an epicyclical gear with a given ratio, but without any mechanical contact.

By means of the MVR gear 654, an external two-pole motor 650, operated at 16⅔ Hz (with a fixed speed of about 1000 rpm) can produce a variable output speed from about 0 to 6000 rpm. The external motor 650 can therefore be driving at fixed speed from a fixed frequency power grid. By reducing the transmission frequency to e.g. 16⅔ Hz (50/3) the losses related to the power transmission can be reduced. Additionally, a subsea grid might be used to supply several subsea consumers can be established with a common fixed low frequency transmission cable.

As mentioned, the main fixed speed motor 650 can be of PM, induction or other type, such as a reluctance motor. In order to eliminate a direct on-line start of the main motor 650, the MVR gear 654 in combination with the SCS 870 can be used to rotate the SCR 800 in a reverse direction during the initial spin up of the fixed speed motor 650. This allows for synchronous speed matching when initially bringing the pump on line. This example technique is schematically illustrated in the state diagram of FIG. 10 and the plots of FIG. 11.

Figure 10:
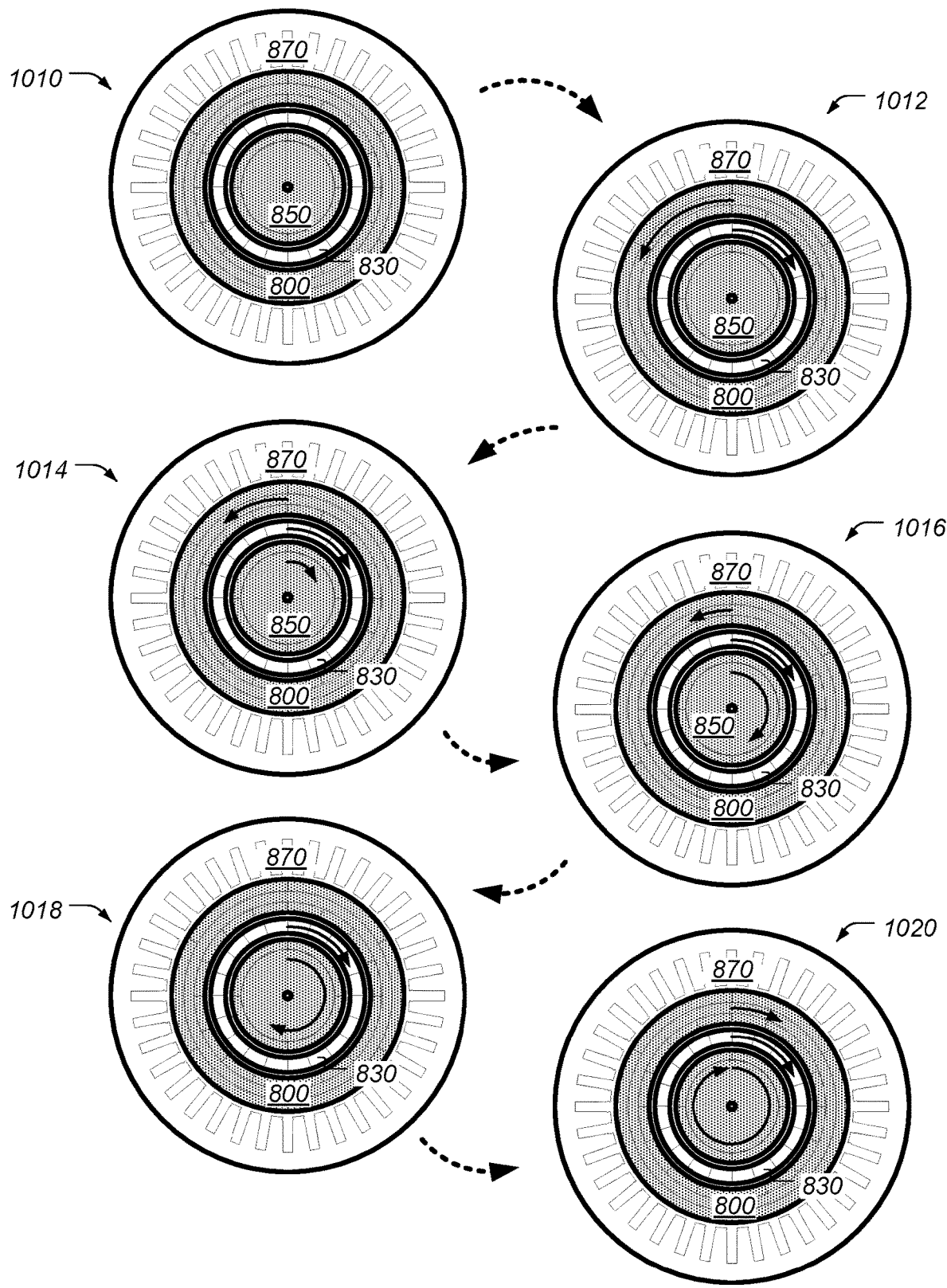
FIG. 10 is a diagram illustrating various states during operation of a magnetic variable ratio gear, according to some embodiments.
Figure 11:
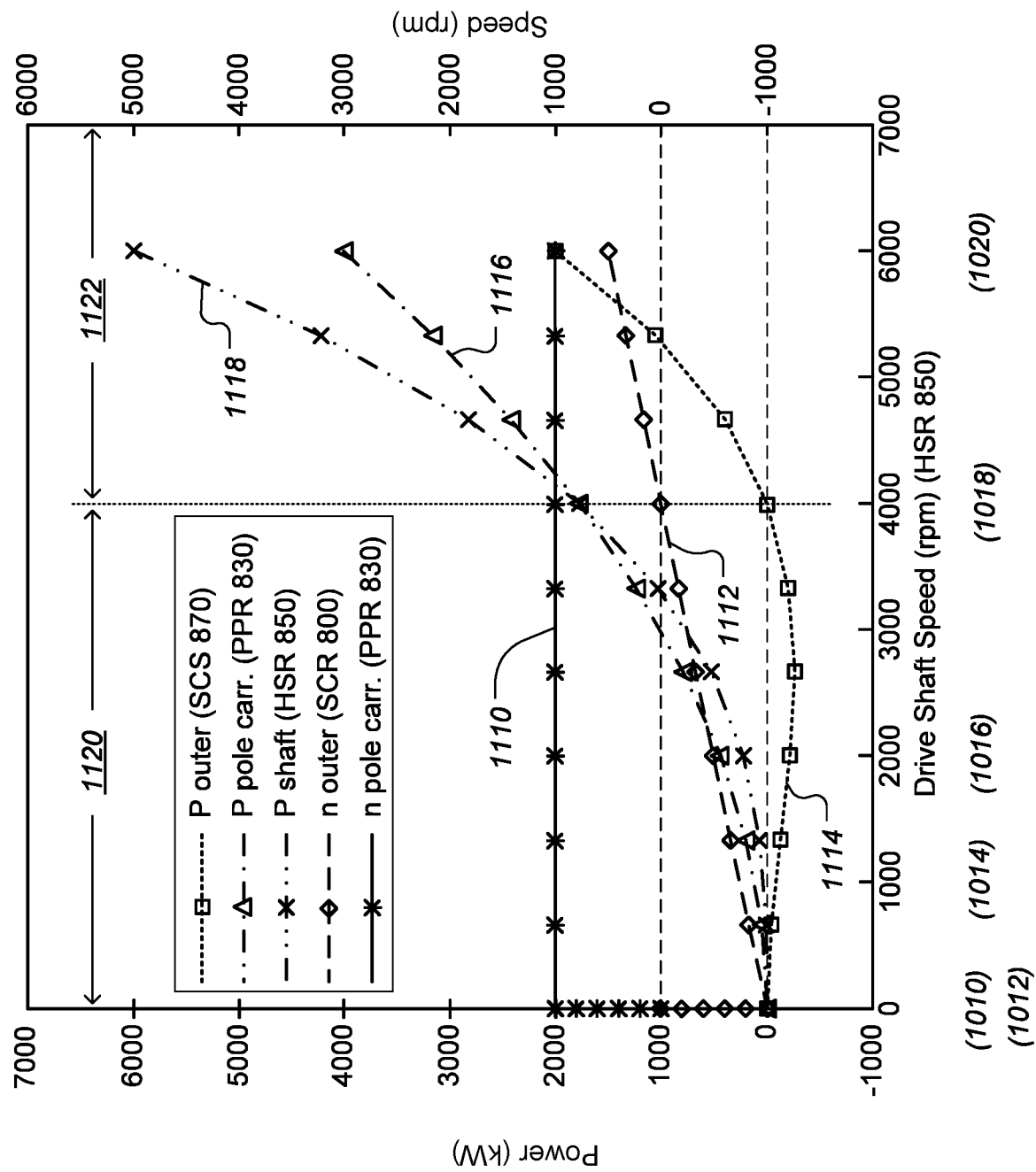
FIG. 11 is a graph showing several plots showing aspects of various stages of operation of a magnetic variable ratio gear, according to some embodiments.

FIG. 10 is a diagram illustrating various states during operation of a magnetic variable ratio gear, according to some embodiments. FIG. 11 is a graph showing several plots illustrating aspects of various stages of operation of a magnetic variable ratio gear, according to some embodiments. FIG. 10 shows six states of the MVR gear. The relative rotational directions and rotational speeds of the three rotating members SCR 800, PPR 830 and HSR 850 are shown for each state with solid arrows. The six states 1010, 1012, 1014, 1016, 1018 and 1020 shown in FIG. 10 correspond to various output drive shaft speeds that are shown in parenthetical reference numbers along the horizontal axis of FIG. 11. In FIG. 11, curves 1114, 1116 and 1118 plot the power applied (or generated) by the SCS 870, PPR 830 and HSR 850, respectively. Curves 1110 and 1112 plot the rotational speed of PPR 830 and SCR 800 respectively.

The following description refers to both FIGS. 10 and 11. State 1010 shows the MVR gear in an "all stopped" state where SCR 800, PPR 830 and HSR 850 are all stationary. The fixed speed drive motor 650 (shown in FIG. 6) which drives PPR 830, and SCS 870 which drives SCR 800 are both unpowered. In FIG. 11 state 1010 is shown at drive shaft speed=0. There is no power applied (or generated) by SCS 870, PPR 830 and HSR 850 as shown in curves 1114, 1116 and 1118, respectively. Additionally, the rotational speeds of SCR 800 and PPR 830 are both zero as can be seen in curves 1110 and 1112, respectively. As part of the start-up procedure, the SCR 800 is initially rotated in a direction that is opposite to the drive motor 650 and PPR 830. If the speeds of both SCR 800 and PPR 830 are increased synchronously from about 0 to 1000 rpm but in opposite directions, the output shaft and HSR 850 will remain stationary. According to some embodiments, an anti-rotation device (not shown) may be included in the HSR shaft to prevent reverse rotation during acceleration of PPR 830 and the external motor 650. This state 1012 is shown in FIG. 10. In FIG. 11 this is shown by the curves 1110 indicating PPR 830 spins to +1000 rpm and curve 1112 indicating SCR 800 spins to −1000 rpm, while the output shaft HSR 850 remains stationary. Note that from this point forwards the PPR 830 is driven at +1000 rpm, as indicated by curve 1110, when the drive motor 650 is operating at a fixed speed by a fixed frequency power feed. In order to start rotating HSR 850 and therefore the pump, the reverse spin of SCR 800 is gradually decreased. State 1014 illustrates the situation where the reverse spin of SCR 800 has been reduced to −750 rpm. This causes the shaft HSR to rotate at +1000 rpm. Note that the power curve 1114 for SCS 870 dips into negative values in region 1120 of FIG. 11. This indicates that the SCS 870 is actually generating power that according to some embodiments is fed back into the drive motor 650 via the subsea switch gear 640 (both shown in FIG. 6). In this example, for HSR 850 shaft speeds of less than 4000 rpm, the SCS 870 generates power. State 1016 illustrates the situation where the reverse spin of SCR 800 is reduced to −500 rpm, which causes HSR 820 to rotated at +2000 rpm. State 1018 illustrates the point at which SCR 800 is stationary and is therefore neither generating or using power. The power of both PPR 830 (i.e. the drive motor 650) and the output shaft HSR 850 are equal at about 1800 kW since no power is being contributed or used by SCS 870. At this point, the HSR shaft 850 is driven at +4000 rpm. In order to drive HSR 850 at speeds greater than 4000 rpm, VSD 660 (shown in FIG. 6) is used to rotate SCR 800 in the same direction as PPR 830 and HSR 850 (i.e. all clockwise in the example of FIG. 10). In state 1020 SCR 800 spins at +500 rpm, causing the shaft HSR 850 to spin at +6000 rpm. Note that in the region 1122 of FIG. 11, where the HSR is driven at its highest speeds (4000 to 6000 rpm), all of the rotating members 800, 830 and 850 rotate in the same direction which is beneficial in reducing viscous losses.

As mentioned, when operating in region 1122, MVR motor (i.e. SCS 870 and SCR 800) will contribute additional power to the main motor (motor 650 driving PPR 830) to drive HSR 850 and pump 658 via output shaft 656 (shown in FIG. 6). At speeds below the rated 4000 rpm, (in region 1120 of FIG. 11) the SCR 800 and SCS 870 will in effect feed energy back to the grid while rotating in a reverse direction. This energy can simply be recycled back to drive the main motor 650 and only the marginal losses in the components will be lost. This feature can contribute to increase the overall efficiency of the system.

Thus, according to some embodiments, the majority of the power to the high speed load (pump 658 in FIG. 6) is provided through an external high efficiency motor 650, running directly off the fixed low frequency MV power supply at constant low speed (e.g. 16⅔ Hz). The rotational torque from the external low speed, high torque motor 650 is transferred via a shaft to the Pole Piece Rotor (PPR) 830. Starting of the external low speed motor will be performed by means of the MVR gear 654 and the subsea VSD 660. By rotating the SCR 800 in negative direction while the pump shaft 656 is at rest, the main motor 850 will accelerate. Once the main motor 650 has been accelerated to synchronous speed (i.e. state 1012 in FIGS. 10 and 11) it is tied to the MV distribution bus through the dedicated circuit breaker (CB).

Once started, the PPR 830 will rotate at constant or near constant speed. The outer rotor, the Speed Control Rotor (SCR) 800, is energized by the three-phase stator 870 and an external inverter to rotate both ways, or even be at rest, at full torque. For example, by arranging the SCR 800 with 6 exterior poles, the external inverter can operate within an operating frequency range (0 Hz-50 Hz), and the magnetic stator backing can be kept thin to optimize the overall diameter of the machine. The higher frequency compared to the transmission frequency is beneficial and will have no negative effects due to the short distance between the inverter and the motor terminals. The number of poles in the SCR 800 and the inverter frequency range can be selected to suit the application. Direction and speed of rotation of the SCR 800 dictate the effective gear ratio and output speed of the HS shaft of HSR 850. The HSR 850 will rotate with a speed given by the following equation:

$$N_{HS}=(N_{PPR}+N_{SCR})*R$$

Where: $N_{HS}$=Speed of HS output shaft (HSR 850); $N_{PPR}$=Speed of Pole Piece Rotor (PPR 830); $N_{SCR}$=Speed of Speed Control Rotor (SCR 800); and R="Gear" Ratio between PPR and HSR. The "Gear" Ratio is given by:

$$\frac{\text{Number of } PM \text{ poles in outer ring (outer ring of } SCR \text{ 800)}}{\text{Number of } PM \text{ poles in center ring (} HSR \text{ 850)}}$$

The inherent gear direction of rotation is given by the number of pole pieces in the PPR 830. By setting the number of pole pieces equal to the sum of the number of pole pairs 812 (eight in this case) in the SCR and the number of pole pairs 852 on the HSR (two in this case) the HSR will rotate in the same direction as the PPR. By setting the number of pole pieces equal to the difference between the number of pole pairs 812 in the SCR and the number of pole pairs 852 on the HSR, the inner ring will rotate in the opposite direction of the PPR By changing the direction of rotation of the SCR 800, the HSR 850 can run slower or faster than the PPR 830 multiplied by R (the gear ratio). Hence, the variable high speed pump shaft power might be provided by the sum of the fixed low speed motor power and the gear control motor power via the variable ratio magnetic gear. In FIG. 11 this embodiment is indicated by curve 1118 being the sum of curves 1116 and 1114. The main low speed motor might provide more than ⅔ of the power and the gear control motor might provide less than ⅓ of the total power supplied to the pump shaft at maximum speed. However, the power split between the two motors may be selected to suit the application. The power from both motors is summed, and the speed is multiplied in the MVR gear to provide the desired shaft output power and speed to the load shaft.

Thus, the techniques described enable the transmission of power from a fixed low frequency supply placed topside to the subsea installation over a single 3 phase cable, while still running one or more pump(s) at desirable high, variable and individual speed in the range of about 3000 to 6000 rpm.

Although some of the embodiments described supra have related to using magnetic gearing to implement long distance power transmission to subsea stations such as subsea pumping modules, the techniques are not limited to such applications. For example, according to some embodiments, magnetic gearing might be used to implement long distance power transmission to and/or from other rotating machinery. The techniques described herein can be applied to applications where long distance transmission benefits from transmission frequencies that are lower than the rotating machinery can use or supply. Additionally, the techniques described herein can be beneficial in applications where it is desirable to have a liquid-filled transmission since viscous losses can be reduced over mechanical gear systems.

Figure 12:
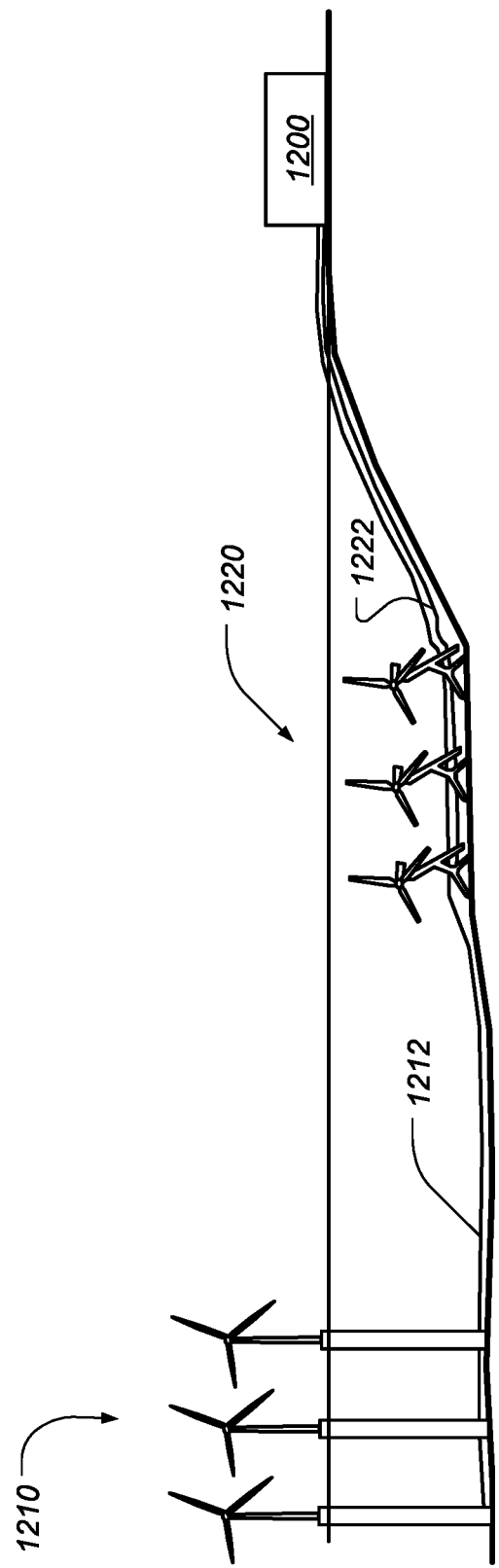
FIG. 12 is a diagram illustrating magnetic gearing being used to enable efficient power transmission from windmills and seawater turbines, according to some embodiments.

FIG. 12 is a diagram illustrating magnetic gearing being used to enable efficient power transmission from windmills and seawater turbines, according to some embodiments. Shown are a plurality of wind turbines 1210 deployed in a location that is remote from a station 1200 that may form part of an electric power transmission and/or distribution grid. According to some embodiments, each of the wind turbines 1210 have a magnetic gear such as PM gear 254 or MVR gear 654 which converts rotational speeds (i.e. either step-up or step-down) between rotating shafts of, for example, the turbine and the generator. By selecting appropriate pole numbers and intermediate passive pole flux paths as described herein, the magnetic gearing can be configured to suit the particular application. Through the use of the magnetic gearing, the power transmission through cables 1212 can be made at a suitable frequency to reduce losses. Similarly, FIG. 12 shows a plurality of seawater turbines 1220 that are being used, for example, for generating power from tidal currents. According to some embodiments, each of the water turbines 1220 have a magnetic gear such as PM gear 254 or MVR gear 654 which converts rotational speeds (i.e. either step-up or step-down) between rotating shafts of the turbine and the generator, for example. Through the use of the magnetic gearing, the power transmission through cables 1222 can be made at a suitable frequency to reduce losses. Additionally, in the case where the magnetic gearing is implemented in a subsea location, the gearing modules can be liquid filled with lower viscous losses when compared to mechanical gearing through the techniques described supra such as by using smooth surfaces and rotating components in the same direction.

Figure 13:
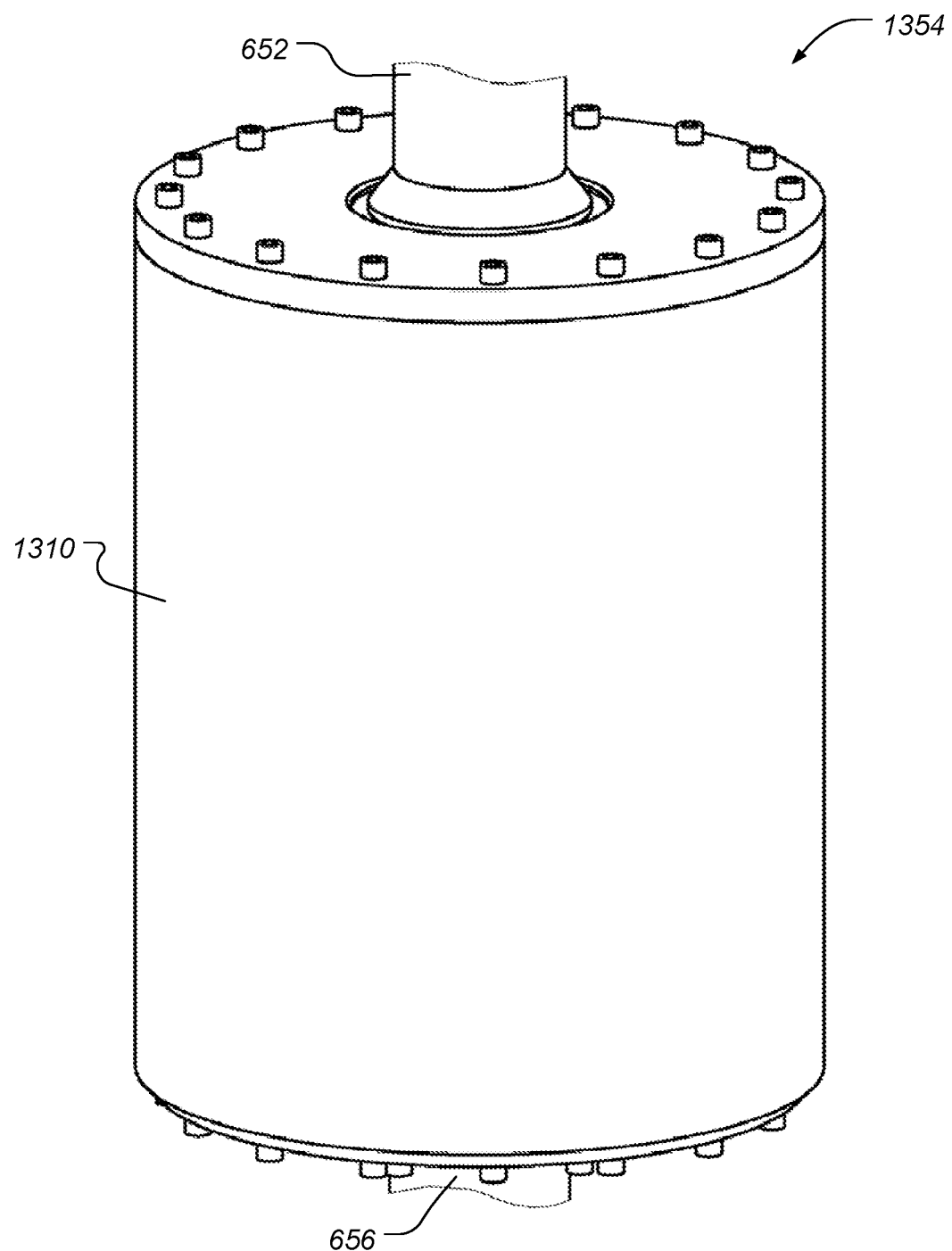
FIG. 13 is a perspective view of an alternative liquid filled variable magnetic gear, according to some embodiments.
Figure 14:
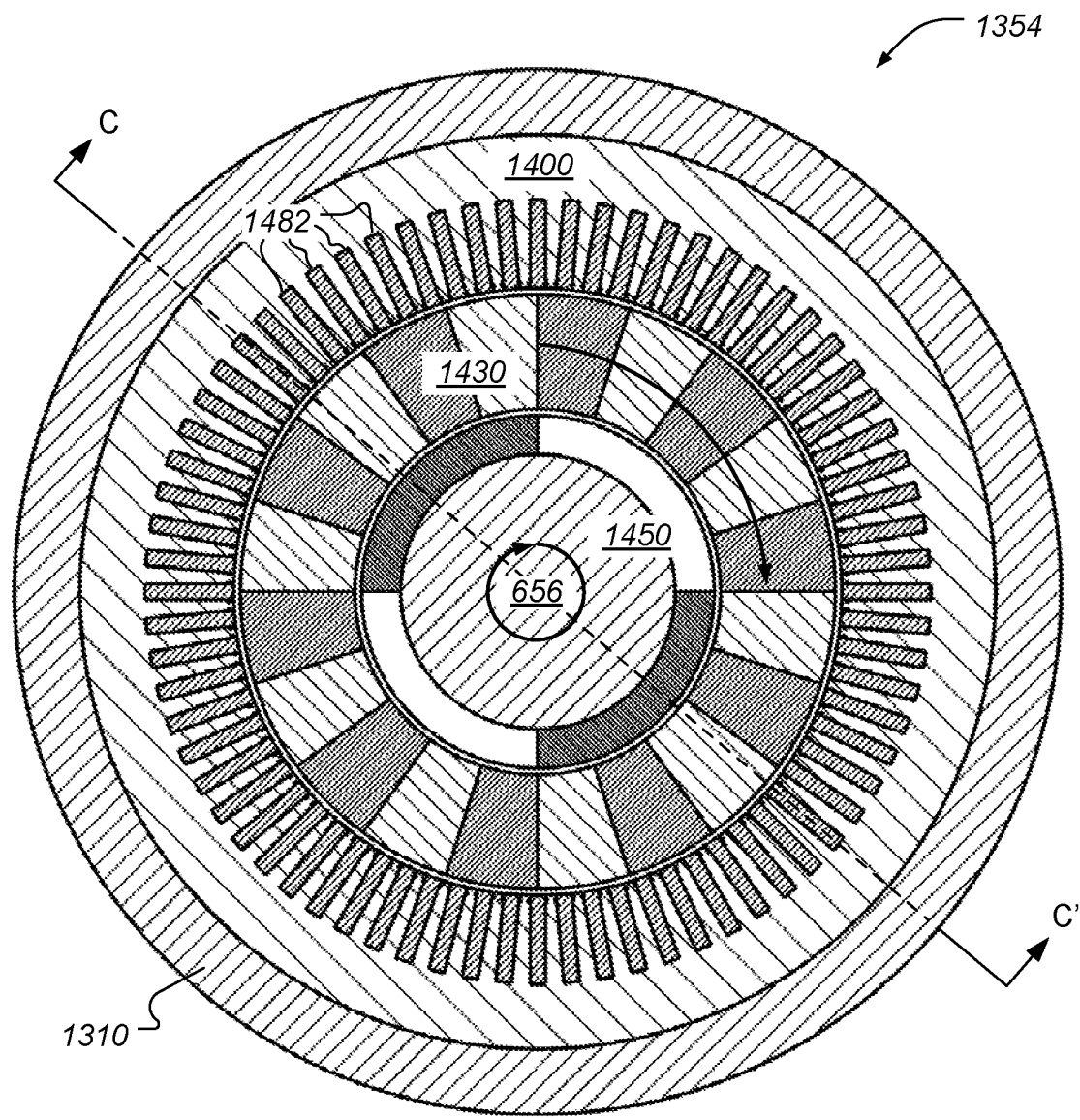
FIG. 14 is a cross section of an alternative liquid-filled variable magnetic gear, according to some embodiments.

FIG. 13 is a perspective view of another example of liquid filled variable magnetic gear, according to some embodiments. MVR 1354 has an out shell 1310. Visible are fixed-speed input shaft 652 and variable speed output shaft 656 which correspond to the input and output shafts shown in FIG. 6. FIG. 14 is a cross section of another example of liquid-filled variable magnetic gear, according to some embodiments. It can be seen that MVR 1354 uses a simpler structure than MVR 654 shown in FIGS. 8 and 9. In particular the rotating SCR 800 shown in FIGS. 8 and 9 is replaced by a direct Magnetic Speed Controller (MSC) 1400. MSC 1400 is similar to the Speed Control Stator 870 (shown in FIGS. 8 and 9) except that MSC 1400 is configured to provide a number of electromagnetic stator poles using a plurality of stator windings 1482. The number of electromagnetic stator poles in MSC 1400 might be equal to the number of PM poles on the inner diameter of the mechanical SCR 800 shown in FIG. 8. The flux provided by the electromagnetic stator poles will interfere with the passive pole pieces on pole piece rotor 1430 which is analogous to the pole piece rotor 830 shown in FIG. 8. The interaction between the electromagnetic stator poles and passive pole pieces on rotor 1430 provides a given "gear" ratio of MVR 1354. A difference between the rotating SCR MVR 654 and MVR 1354, apart from the mechanical simplification, is the frequency of the variable electric power used. Since MSC 1400 provides a number of electromagnetic stator poles that are used to achieve the gear ratio directly, the number of electromagnetic poles tends to be higher. In order to provide the same rotating flux vector as in the PM counterpart of MVR 654, the stator frequency of MSC 1400 might be higher. In the given example, the rated stator frequency of MSC 1400 may be increased from 50 Hz to 133 Hz to achieve the same rotational speed capabilities.

Figure 15:
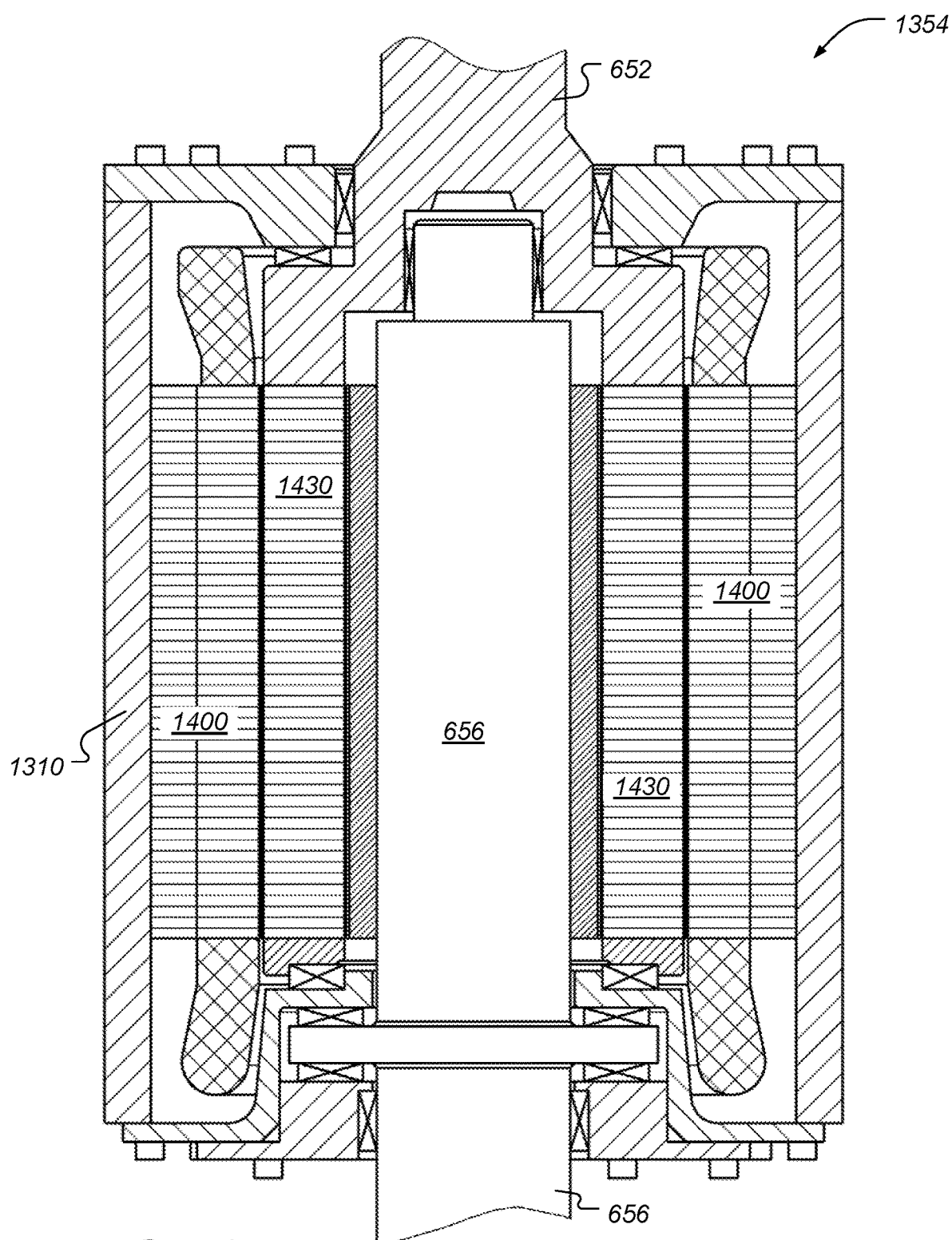
FIG. 15 is a cross section along C-C' of the alternative liquid-filled variable magnetic gear shown in FIG. 14.

FIG. 15 is a cross section along C-C' of the example of liquid-filled variable magnetic gear shown in FIG. 14. In FIG. 14 it can be seen that input shaft 652 is fixedly attached to pole piece rotor 1430 using a flanged portion. The axial and radial alignments of the various rotating members might be maintained using a number of bearings as shown. Note that other bearings may be included but are not shown for purposes of clarity. Furthermore, the internal volumes of MVR gear 1354 might be filled with barrier fluid although it is not shown in FIG. 15 for purposes of clarity.

According to some embodiments, the operation of MVR 1354 is similar to that of MVR 654 in several respects. In particular, FIGS. 10 and 11, along with the descriptions, supra, apply equally to MVR 1354 by substituting analogous structures (e.g. substituting MSC 1400 for SCR 800).

While the subject disclosure is described through the above embodiments, it will be understood by those of ordinary skill in the art that modification to and variation of the illustrated embodiments may be made without departing from the inventive concepts herein disclosed. Moreover, while some embodiments are described in connection with various illustrative structures, one skilled in the art will recognize that the system may be embodied using a variety of specific structures.

What is claimed is:

1. A system for powering a subsea rotating machine, comprising:
an electrical power supply located at a surface facility and configured to supply multi-phase high-voltage low-frequency alternating-current electrical power;
a power transmission cable electrically coupled to the electrical power supply and configured to carry the multi-phase high-voltage low-frequency alternating-current electrical power to a subsea location;
a first subsea motor located at the subsea location and electrically coupled to the power transmission cable, wherein the first subsea motor is configured to rotate a first motor output element at a first drive rotational frequency using the multi-phase high-voltage low-frequency alternating-current electrical power;
a first variable speed drive located at the subsea location and configured to supply first variable frequency electrical power to a first plurality of stator windings to create first rotating magnetic fields;
a first subsea magnetic gear module configured to combine the first rotating magnetic fields with rotation of the first motor output element to rotate a first output shaft;
a first subsea rotating machine located at the subsea location and configured to use the first output shaft in its operation;
a second subsea motor located at the subsea location and electrically coupled to the power transmission cable, wherein the second subsea motor is configured to rotate a second motor output element at a second drive rotational frequency;
a second variable speed drive located at the subsea location and configured to supply second variable frequency electrical power to a second plurality of stator windings to create second rotating magnetic fields;
a second subsea magnetic gear module configured to combine the second rotating magnetic fields with rotation of the second motor output element to rotate a second output shaft;
a second subsea rotating machine located at the subsea location and configured to use the second output shaft in its operation; and
a subsea switching module configured to selectively route the multi-phase high-voltage low-frequency alternating-current electrical power from the power transmission cable to the first subsea motor and the first variable speed drive, or the second subsea motor and the second variable speed drive.

2. The system of claim 1, wherein the first subsea magnetic gear module is configured to have first effective gear ratio of a first working rotational frequency of the first output shaft to the first drive rotational frequency of greater than one, or wherein the second subsea magnetic gear module is configured to have a second effective gear ratio of a second working rotational frequency of the second output shaft to the second drive rotational frequency of greater than one.

3. The system of claim 1, wherein the first subsea magnetic gear module includes a first plurality of permanent magnets on a first pole piece rotor of the first subsea magnetic gear and a first magnetic gear rotor of the first subsea magnetic gear, or wherein the second subsea magnetic gear module includes a second plurality of permanent magnets on a second pole piece rotor of the second subsea magnetic gear and a second magnetic gear rotor of the second subsea magnetic gear.

4. The system of claim 1, wherein the first subsea magnetic gear module or the second subsea magnetic gear module is liquid-filled.

5. The system of claim 1, wherein the first subsea magnetic gear module is configured to enable a first working rotational frequency of the first output shaft of at least twice the first drive rotational frequency, or wherein the second subsea magnetic gear module is configured to enable a second working rotational frequency of the second output shaft of at least twice the second drive rotational frequency.

6. The system of claim 1, wherein the electrical power supply includes a step-up transformer and a step-down transformer located at the subsea location, wherein the step-down transformer is configured to reduce voltage of the multi-phase high-voltage low-frequency alternating-current electrical power for use by the first subsea motor and the second subsea motor.

7. The system of claim 1, wherein the electrical power supply is configured to adjust voltage and frequency of the multi-phase high-voltage low-frequency alternating-current electrical power, and an effective gear ratio of a working rotational frequency of the first output shaft or the second output shaft to the first drive rotational frequency or the second drive rotational frequency is fixed and is at least two.

8. The system of claim 1, wherein the electrical power supply is configured to supply the multi-phase high-voltage low-frequency alternating-current electrical power at a fixed frequency, and wherein the first subsea magnetic gear module or the second magnetic gear module is configured to adjust an effective gear ratio.

9. The system of claim 1, wherein the first subsea magnetic gear module or the second subsea magnetic gear module comprises a speed control rotor and a pole piece rotor, wherein the first variable speed drive or the second variable speed drive is configured to enable the first rotating magnetic fields or the second rotating magnetic fields to rotate the speed control rotor in a direction opposite to rotation of the pole piece rotor and rotation of the first output shaft or the second output shaft.

10. The system of claim 9, wherein energy is generated by the first plurality of stator windings or the second plurality of stator windings during operation when the speed control rotor and the pole piece rotor are rotating in opposite directions, and wherein the energy is used to partially power the first subsea motor or the second subsea motor.

11. The system of claim 9, wherein the first subsea magnetic gear module or the second subsea magnetic gear module is liquid-filled and comprises a magnetic gear rotor, and wherein the speed control rotor, the pole piece rotor, and the magnetic gear rotor each rotate in the same direction.

12. The system of claim 1, wherein the first subsea magnetic gear module or the second subsea magnetic gear module comprises a pole piece rotor having a plurality of alternating sections of magnetic and non-magnetic material.

13. The system of claim 1, wherein the first subsea magnetic gear module or the second subsea magnetic gear module comprises a magnetic gear rotor having a plurality of alternating magnetic north and magnetic south pieces.

14. The system of claim 1, wherein the first subsea magnetic gear module or the second subsea magnetic gear module comprises a pole piece rotor and a magnetic gear rotor, wherein an inner surface and an outer surface of the pole piece rotor and an outer surface of the magnetic gear rotor comprise smooth surfaces.

15. The system of claim 1, wherein the first subsea magnetic gear module or the second subsea magnetic gear module comprises a pole piece rotor and a magnetic gear rotor, wherein the first subsea magnetic gear module or the second subsea magnetic gear module is configured to adjust an effective gear ratio by controlling a speed of rotation of the pole piece rotor, a direction of rotation of the speed control rotor, and a speed of rotation of the speed control rotor.

16. The system of claim 1, wherein the first subsea magnetic gear module or the second subsea magnetic gear module comprises a speed control rotor, wherein the speed control rotor is configured to be rotated in a first direction by the first rotating magnetic fields created by the first plurality of stator windings, wherein the first variable speed drive is configured to supply second variable frequency electrical power to the first plurality of stator windings to create third rotating magnetic fields, wherein the speed control rotor is configured to be rotated in a second direction by the third rotating magnetic fields.

17. The system of claim 16, wherein the first direction is opposite from the second direction.

18. A method of powering a subsea rotating machine comprising:
supplying low-frequency high-voltage electrical power from a surface facility through a power transmission cable to a subsea location;
selectively routing the low-frequency high-voltage electrical power from the power transmission cable to a first subsea motor and a first variable speed drive, or a second subsea motor and a second variable speed drive;
in response to routing the low-frequency high-voltage electrical power from the power transmission cable to the first subsea motor and the first variable speed drive:
operating the first subsea motor that uses the low frequency high-voltage electrical power to rotate a first motor output element at a first drive frequency;
stepping-up the first drive frequency to a first higher working frequency on a first output shaft using a first subsea magnetic gear module comprising a first plurality of rotating elements and a first plurality of permanent magnet pieces;
operating a first subsea rotating machine using the first output shaft at the first higher working frequency; and
in response to routing the low-frequency high-voltage electrical power from the power transmission cable to the second subsea motor and the second variable speed drive:
operating the second subsea motor that uses the low frequency high-voltage electrical power to rotate a second motor output element at a second drive frequency;
stepping-up the second drive frequency to a second higher working frequency on a second output shaft using a second subsea magnetic gear module at the second drive frequency and rotation of a second speed control rotor of the second subsea magnetic gear module comprising a second plurality of rotating elements and a second plurality of permanent magnet pieces; and
operating a second subsea rotating machine using the second output shaft at the second higher working frequency.

19. The method of claim 18, comprising reducing voltage of the low-frequency high-voltage electrical power to a low-frequency medium-voltage electrical power using one or more subsea transformers at the subsea location.

20. The method of claim 18, wherein the first subsea magnetic gear module is configured to provide a fixed ratio of the first higher working frequency to the first drive frequency, wherein the method comprises, at the surface facility, adjusting a frequency of the low-frequency high-voltage electrical power to adjust the first higher working frequency and speed of the first subsea rotating machine.

21. The method of claim 18, wherein the surface facility is configured to supply the low-frequency high-voltage electrical power at a fixed frequency.

22. The method of claim 18, comprising adjusting the first higher working frequency or the second higher working frequency by controlling a speed of rotation of a pole piece rotor of the first plurality of rotating elements or the second plurality of rotating elements, a direction of rotation of a speed control rotor of the plurality of rotating elements, and a speed of rotation of the speed control rotor.

23. The method of claim 18, wherein the second subsea magnetic gear module is configured to provide a fixed ratio of the second higher working frequency to the second drive frequency, wherein the method comprises, at the surface facility, adjusting a frequency of the low-frequency high-voltage electrical power to adjust the second higher working frequency and speed of the second subsea rotating machine.

24. A system for transmitting low frequency electrical power over long distances comprising:
   a long distance power transmission cable at least 20 kilometers in length;
   a first electrical transducer electrically connected to one end of the long distance power transmission cable with a first rotating element configured to rotate synchronously with a frequency of power transmitted over the long distance power transmission cable; and
   a first magnetic gear module mechanically coupled to the first electrical transducer and comprising:
      a first pole piece rotor mechanically coupled to the first rotating element of the first electrical transducer; and
      a first magnetic gear rotor mechanically coupled to a first shaft, wherein the first pole piece rotor and the first magnetic gear rotor are configured to be magnetically coupled to each other, wherein the first magnetic gear module is configured to rotate the first magnetic gear rotor based on rotation of the first pole piece rotor;
   a second electrical transducer electrically connected to the one end of the long distance power transmission cable with a second rotating element configured to rotate synchronously with the frequency of power transmitted over the long distance power transmission cable;
   a second magnetic gear module mechanically coupled to the second electrical transducer and comprising:
      a second pole piece rotor mechanically coupled to the second rotating element of the second electrical transducer; and
      a second magnetic gear rotor mechanically coupled to a second shaft, wherein the second pole piece rotor and the second magnetic gear rotor are configured to be magnetically coupled to each other, wherein the second magnetic gear module is configured to rotate the second magnetic gear rotor based on rotation of the second pole piece rotor; and
   a subsea switching module configured to selectively route electrical power from the long distance power transmission cable to the first electrical transducer or the electrical second transducer.

25. The system of claim 24, wherein the first magnetic gear module is configured to adjust a first gear ratio of the first magnetic gear rotor by controlling speed of rotation of the first pole piece rotor, or the second magnetic gear module is configured to adjust a second gear ratio of the second magnetic gear rotor by controlling speed of rotation of the second pole piece rotor.

26. The system of claim 25, wherein space between a first speed control rotor and the first pole piece rotor of the first magnetic gear module or between second speed control rotor and the second pole piece rotor is filled with barrier fluid.

27. The system of claim 25, wherein the first magnetic gear module or the second magnetic gear module comprises, a speed control rotor, an outer shell, and a speed control stator, wherein the speed control stator is disposed between the speed control rotor and the outer shell, wherein the speed control stator comprises plurality of stator windings of the first magnetic gear module or the second magnetic gear module.

28. The system of claim 27, wherein space between the speed control stator and the speed control rotor is filled with barrier fluid.

* * * * *